US012764098B2

(12) United States Patent
Nambula et al.

(10) Patent No.: US 12,764,098 B2
(45) Date of Patent: Oct. 13, 2026

(54) MOBILE DEVICE MANAGEMENT INCLUDING FEATURES OF PASSWORDLESS AUTHENTICATION

(71) Applicant: Ivanti, Inc., South Jordan, UT (US)

(72) Inventors: Venkata Nambula, Los Gatos, CA (US); Mohamad Raja Gani, San Francisco, CA (US); Mohammad Aamir, Seattle, WA (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 19/062,850

(22) Filed: Feb. 25, 2025

(65) Prior Publication Data

US 2025/0220002 A1 Jul. 3, 2025

Related U.S. Application Data

(63) Continuation of application No. 18/193,611, filed on Mar. 30, 2023, now Pat. No. 12,238,074.

(60) Provisional application No. 63/325,307, filed on Mar. 30, 2022.

(51) Int. Cl.

| | |
|---|---|
| ***H04L 9/40*** | (2022.01) |
| ***H04L 9/08*** | (2006.01) |
| ***H04L 9/32*** | (2006.01) |
| ***H04W 12/069*** | (2021.01) |

(52) U.S. Cl.

CPC ........ *H04L 63/0428* (2013.01); *H04L 9/0825* (2013.01); *H04L 9/0841* (2013.01); *H04L 9/085* (2013.01); *H04L 9/3268* (2013.01); *H04L 9/3273* (2013.01); *H04W 12/069* (2021.01)

(58) Field of Classification Search

CPC .................................................. H04L 63/0428

See application file for complete search history.

(56) References Cited

U.S. PATENT DOCUMENTS

2011/0051642 A1* 3/2011 Krishnaswamy ..... H04W 40/10 370/389

2013/0185559 A1* 7/2013 Morel ................. G06Q 20/353 713/168

2020/0067907 A1* 2/2020 Avetisov ............... H04L 67/133

2020/0280855 A1* 9/2020 Avetisov ................ H04L 63/20

* cited by examiner

*Primary Examiner* — Bradley W Holder

(57) ABSTRACT

A method of securely storing a device password. The method includes receiving from a relying party, via a communication interface, a first public encryption key associated with a first device associated with a user identity. The method includes generating, at a second device associated with the same user identity and registering with the relying party, a public encryption key pair that includes a second public encryption key. The method includes performing a first level of encryption with respect to a password encryption key associated with encrypting a device password of the second device to produce a singly encrypted password encryption key using the second public encryption key. The method includes performing a second level of encryption with respect to the singly encrypted password encryption key to produce a doubly encrypted password encryption key using the first public encryption key and storing the it on the second device.

19 Claims, 14 Drawing Sheets

MOBILE DEVICE MANAGEMENT INCLUDING FEATURES OF PASSWORDLESS AUTHENTICATION

CROSS REFERENCE TO RELATED APPLICATIONS

This application is a continuation of U.S. patent application Ser. No. 18/193,611 filed Mar. 30, 2023 and issued as U.S. Pat. No. 12,238,074 issued Feb. 25, 2025, which claims the benefit of and priority to U.S. Provisional Application No. 63/325,307, filed Mar. 30, 2022. These applications are incorporated herein by reference in their entireties.

FIELD

This application is related to secure communication between devices. In particular, some embodiments are related to systems and methods for secure password storage.

BACKGROUND

Passwords are the root cause of a substantial proportion of data breaches. Users tend to set relatively weak passwords, which are easier to remember, and to reuse passwords across multiple applications, domains, and services. Forgotten passwords lead to inefficiencies such as lost time, use of network and computing resources to reset passwords, and transactions not completed due to failure to remember a password.

The FIDO protocols, based on public key cryptography techniques, enable strong authentication to be performed without using passwords. During FIDO registration with an online service, the user's client device creates a new key pair. It retains the private key and registers the public key with the online service. Authentication is done by the client device proving possession of the private key to the service by signing a challenge. The client's private keys can be used only after they are unlocked locally on the device by the user. The local unlock typically is accomplished by a user-friendly and secure action such as swiping a finger, entering a PIN, speaking into a microphone, inserting a second-factor device or pressing a button.

FIDO authentication has come into widespread use to access online services. However, passwords and passcodes continue to be used to control access to devices, such as desktop or laptop computers, including those managed using a Unified Endpoint Management (UEM) solution.

Bluetooth™ Low Energy or BLE enables mobile and other device, e.g., Internet of Things (IoT) devices, to communicate with each other and with fixed devices, such as desktop computers, over a short range. The BLE standards and protocols facilitate secure communication between paired devices, but in some contexts and use scenarios it may be necessary to communicate securely via BLE between devices that are not paired. For example, Bluetooth™ peripheral devices, such as wireless headsets, speakers, mice and other pointer devices, keyboards, etc. may be paired with a desktop computer, but a desktop computer user's mobile phone may not be paired.

In conventional BLE systems, secure communication cannot be performed between unpaired devices. For instance, secure communication over BLE generally involves first pairing between the devices followed by specific sequences of communication of numeric comparisons etc. on each of the unpaired devices. These processes involve additional manual steps and generate a communication interface that exists outside active communication. These steps are included in conventional systems because the devices do not have prior contact and no means of authenticating one another without active authentication actions by the user. Accordingly, there is a need in the art to enable secure communication between unpaired devices.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of the invention, an embodiment includes a method of securely storing a device password. The method may include receiving from a relying party, via a communication interface, a first public encryption key associated with a first device associated with a user identity. The method may include generating, at a second device associated with the same user identity and registered with the relying party, a public encryption key pair that includes a second public encryption key. The method may include performing a first level of encryption with respect to a password encryption key associated with encrypting a device password of the second device to produce a singly encrypted password encryption key using the second public encryption key. The method may include performing a second level of encryption with respect to the singly encrypted password encryption key to produce a doubly encrypted password encryption key using the first public encryption key. The method may include storing the doubly encrypted password encryption key on the second device.

A further aspect of an embodiment may include non-transitory computer-readable medium having encoded therein programming code executable by one or more processors to perform or control performance of one or more of the operations of the methods of establishing secured communication interface described above.

An additional aspect of an embodiment may include a computing device comprising one or more processors and a non-transitory computer-readable medium having encoded therein programming code executable by one or more processors to perform or control performance of one or more of the operations of the methods of establishing secured communication interface described above.

The objects and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
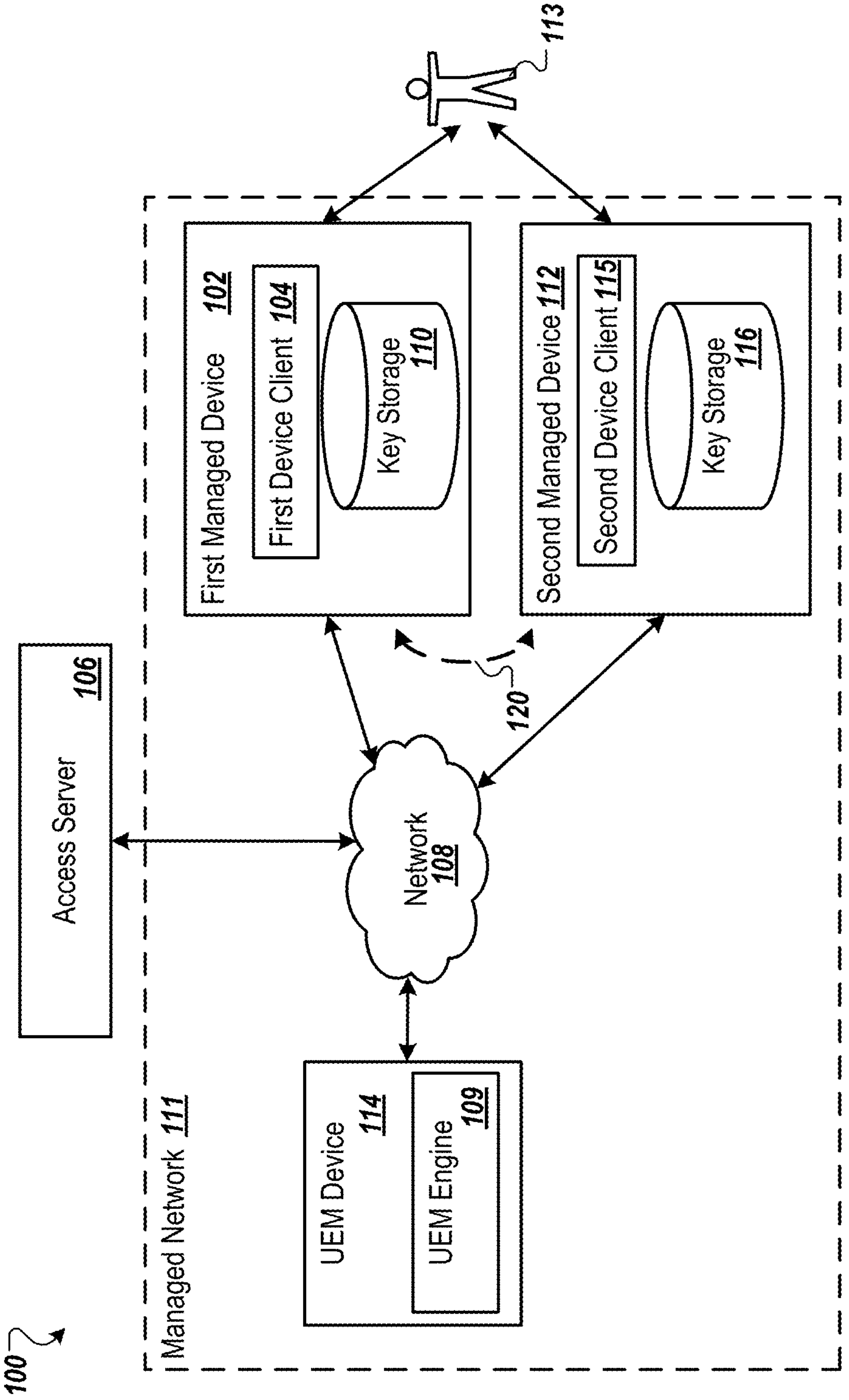
FIG. 1 depicts a block diagram of an example operating environment in which some embodiments described in the present disclosure may be implemented.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide secure communication between non-paired Bluetooth™ devices. In various embodiments, a first client running on a first managed device (e.g., a mobile client running on a mobile device) and a second client running on a second managed device (e.g., a desktop client running on a desktop computer) are registered with a same FIDO Relying Party as FIDO Clients associated with the same user. Since the first client and the second client are registered to the same user, each client knows the FIDO public keys of the other client. In various embodiments, the FIDO public keys of the other client are fetched during FIDO registration. In various embodiments, a FIDO desktop client initiates an authentication request with the mobile client on a designated/configured Bluetooth™ channel (i.e., a specific channel identified by its channel identifier or "channel ID"). The mobile client listens on the same channel and once authentication is initiated the clients use their previously registered and fetched respective FIDO public keys to mutually authenticate. Once mutually authenticated and/or during mutual authentication, the clients perform a key exchange and agree on a shared secret to be used to encrypt/decrypt ongoing communications between them on the Bluetooth™ channel.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 is a block diagram illustrating an example operating environment 100 in which some embodiments of the present disclosure may be implemented. In some embodiments, a unified endpoint management (UEM) engine 109 may communicate information with device clients 104 and 115 to provide secure communication between a first managed device 102 and a second managed device 112 while they are in an unpaired state. For instance, in the depicted embodiment the first managed device 102 and the second managed device 112 may both be associated with a user 113. In the present disclosure, the term "associated with" when referring to a relationship between the user 113 and the devices 102 and 112, may indicate that the user 113 is assigned to regularly interface with the devices 102 and 112. The UEM engine 109 may leverage a passwordless registration process to enable the devices 102 and 112 to securely communicate via a communication interface 120 that is not natively secure and while the devices 102 and 112 are unpaired.

Accordingly, embodiments disclosed herein may overcome a technical limitation related to secure communication. For instance, in conventional systems the devices 102 and 112 may be paired prior to secure communication. In addition, in some conventional systems, establishing secure communication is not based on public/private key verification or shared secret session keys. Instead, these conventional systems may implement other security protocols.

The operating environment 100 of FIG. 1 includes an access server 106, the managed devices 102 and 112, the UEM device 114 that are configured to communicate data and information via a network 108 and a communication interface 120. Each of these components of the operating environment 100 are described in the following paragraphs.

The network 108 may include any communication network configured for communication of signals between the components (e.g., 114, 106, 102, and 112) of the operating environment 100. The network 108 may be wired or wireless. The network 108 may have configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

The communication interface 120 may include a channel of a natively unsecured protocol such as a channel of a Bluetooth protocol. An example of the communication interface may include a Bluetooth Low Energy (BLE) channel. In these and other embodiments, the managed devices 102 and 112 may be Bluetooth-enabled devices.

The access server 106 may include or implement a hardware-based computer device configured to communicate data and information with the other components of the operating environment 100 via the network 108. The access server 106 may be associated with a passwordless authentication system such as the access server implemented in the fast identification online (FIDO) system. The access server 106 may enable the managed devices 102 and 112 to register. During registration, the user 113 creates a new key pair. The public key is registered with the service and the user 113 retains the private key at a local device such as in the key storage 110 or 116. After registration, to authenticate, the user 113 proves possession of the private key by signing a challenge. The signed challenge is sent to the service, which verifies it using the public key. Signing the challenge may be performed by face recognition, fingerprints, entering a pin, etc. Some additional details of the FIDO registration are available at https://fidoalliance.org. In the FIDO example, the access server 106 may be referred to as a relying party.

The UEM device 114 may include or implement a hardware-based computer system that is configured to communicate with the other components of the operating environment 100 via the network 108. The UEM device 114 may include the UEM engine 109. The UEM engine 109 is configured to perform management operations relative to the managed devices 102 and 112. For instance, the UEM engine 109 may discover applications and products on the managed devices 102 and 112. In addition, the UEM engine 109 may perform communication controls, role management, and security settings at the managed devices 102 and 112.

The managed devices 102 and 112 may enroll with the UEM device 114 to create a managed network 111. The managed network 111 may be at least partially implemented remotely. For instance, the managed network 111 may be part of a SAAS and/or cloud-based system, which manages multiple groups of endpoints such as the managed devices 102 and 112. In these and other embodiments, the managed devices 102 and 112 may be one endpoint of multiple endpoints that is managed by the UEM device 114.

The managed network 111 is implemented to enable management of the managed devices 102 and 112 by the UEM device 114. Part of the management of the managed devices 102 and 112 may include role assignment, which may include associating both of the managed devices 102 and 112 with the user 113. In the depicted embodiment, included in the enrollment may include distribution of public keys between the managed devices 102 and 112 that are associated with the user 113. For instance, the first managed device 102 may be distributed one or more public keys of the second managed device 112 including a public key assigned during registration with the access server 106 and vice versa. Additionally or alternatively, because the user is associated with both the managed devices 102 and 112, the public keys may be fetched from the access server 106. For instance, the second managed device 112 may fetch the public key of the first managed device 102 from the access server 106. The public keys of other managed devices 102 or 112 may be stored in the key storage 116 or 110 in some embodiments.

In some embodiments, the managed devices 102 and 112 may be enrolled in the managed network 111. As part of an enrollment process, the clients 104 or 115, may be loaded to the managed devices 102 or 112, respectively. Once enrolled, communication of data, information, commands, notifications, or combinations thereof between the managed devices 102 and 112 and the UEM device 114 may occur. The managed network 111 may be associated with an enterprise, a portion of an enterprise, a government entity, or another entity or set of devices (e.g., 102 and 112).

The managed devices 102 and 112 may include a hardware-based computer system that is configured to communicate with the other components of the operating environment 100 via the network 108 and the communication interface 120. The managed devices 102 and 112 may include a computer device that may be managed by the UEM device 114 and/or has been enrolled in the managed network 111. The managed devices 102 and 112 might include workstations of an enterprise, servers, data storage systems, printers, telephones, internet of things (IOT) devices, smart watches, sensors, automobiles, battery charging devices, scanner devices, etc. The managed devices 102 and 112 may also include virtual machines, which may include a portion of a single processing unit or one or more portions of multiple processing units, which may be included in multiple machines. In the depicted embodiment, the first managed device 102 may include a mobile device of the user 113 and the second managed device 112 may include a desktop device or laptop computer of the user 113.

The managed devices 102 and 112 may be associated with the user 113. The user 113 may be an individual, a set of individuals, or a computer system that is associated with the managed devices 102 and 112. In some embodiments, the user 113 may provide input to the managed devices 102 and 112. The input provided by the user 113 may include credentials information etc. that may be used in one or more of the secure communication operations described in this disclosure.

Each of the managed devices 102 and 112 include one of the clients 104 or 115. The clients 104 and 115 may be implemented to perform one or more operations for secure communication between unpaired devices via the communication interface 120. In general, in embodiments implemented with a FIDO authentication system, secure communications over the communication interface 120 may be performed at least in part by the clients 104 and 115 using their respective FIDO public certificates and previously fetched FIDO public signing key of the other client 104 or 115 to perform mutual authentication. After the managed devices 102 and 112 are mutually authenticated and/or during mutual authentication, the clients 104 and 115 may perform a key exchange and agree on a shared secret to encrypt/decrypt ongoing communications (e.g., messages) between them over the communication interface 120.

For instance, the clients 104 and 115 may register with the access server 106 via the network 108 and to act as an authenticator and client to register one or more key pairs. The key pairs may include a signing key pair, which may be stored in the key storage 110 or 116. The clients 104 and 115 may also create a self-signed certificate for its public key. Additionally, the clients 104 and 115 may fetch the public keys of the other managed devices 102 and 112 associated with the user 113. Accordingly, each of the managed devices 102 and 112 may have a self-signed certificate for itself and may have stored on the key storage 110 or 116 the fetched public key of the other managed device 102 or 112.

Secure communication between the managed devices 102 and 112 may be established by communicating the self-signed certificates via the communication interface 120. The self-signed certificates may be verified using the stored public key stored in the key storage 110 or 116. Verification of the self-signed certificates may authenticate the managed devices 102 and 112. Following authentication, the managed devices 102 and 112 may agree on a shared secret to encrypt and decrypt messages communicated between the managed devices 102 and 112.

In some embodiments, the secure communication may be established when the managed devices 102 and 112 are not connected via the network 108 to the UEM device 114 or one another. This state is sometimes referred to in the present disclosure as an offline mode. In these and other embodiments, while in the offline mode, the managed devices 102 and 112 may only be in communication with one another via the communication interface 120.

In some embodiments, using self-signed FIDO public key certificates to perform mutual authentication between unpaired devices 102 and 112 over a BLE or other Bluetooth (or other) wireless communication channel (e.g., 120) enables a secure channel to be established and used in an offline mode and without the overhead of certificate verification from a certificate authority, because under the approach disclosed herein, the FIDO public keys of the other client 104 or 115 is already available to each client 104 or 115.

In some embodiments, the clients 104 and 115 may also be configured to invalidate one or both public keys. The public keys may be invalidated based at least in part on an amount of time the managed devices 102 or 112 are offline or in an offline mode. Invalidity of the public key(s) may provide an additional level of security. For instance, extended periods of time in an offline mode may be indicative of the managed device 102 or 112 being placed in a less secure and undetected state. In some embodiments, the client 104 or 115 may monitor when the managed device 102 or 112 is in the offline mode. In response to the managed device 102 or 112 being placed in the offline mode, a timer may start. The timer ends when the managed device 102 or 112 communicates via the network 108 to the UEM device 114. Responsive to the time in the offline mode being below a predetermined time period, the public key(s) may remain valid. However, responsive to the time being above the predetermined time, the public key(s) may be invalidated, which may prevent establishment of the secured communication interface. The predetermined time period may be one day, a few days, a few hours, or another suitable duration.

The UEM engine 109, the clients 104 and 115, and components thereof may be implemented using hardware including a processor, a microprocessor (e.g., to perform or control performance of one or more operations), a field-programmable gate array (FPGA), or an application-specific integrated circuit (ASIC). In some other instances, the UEM engine 109, the clients 104 and 115, and components thereof may be implemented using a combination of hardware and software. Implementation in software may include rapid activation and deactivation of one or more transistors or transistor elements such as may be included in hardware of a computing system (e.g., the managed devices 102 or 112 or the UEM device 114 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 111, one or more access servers 106, one or more UEM devices 114, two or more managed devices 102 or 112, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together into a single component or server or separated into multiple components or servers. For example, in some embodiments, the UEM device 114 and the access server 106 may include a single server, a set of servers, a virtual device, a virtual server, one or more computer programs which manages access to computing resources or services, a cloud-based network of servers.

Figure 2:
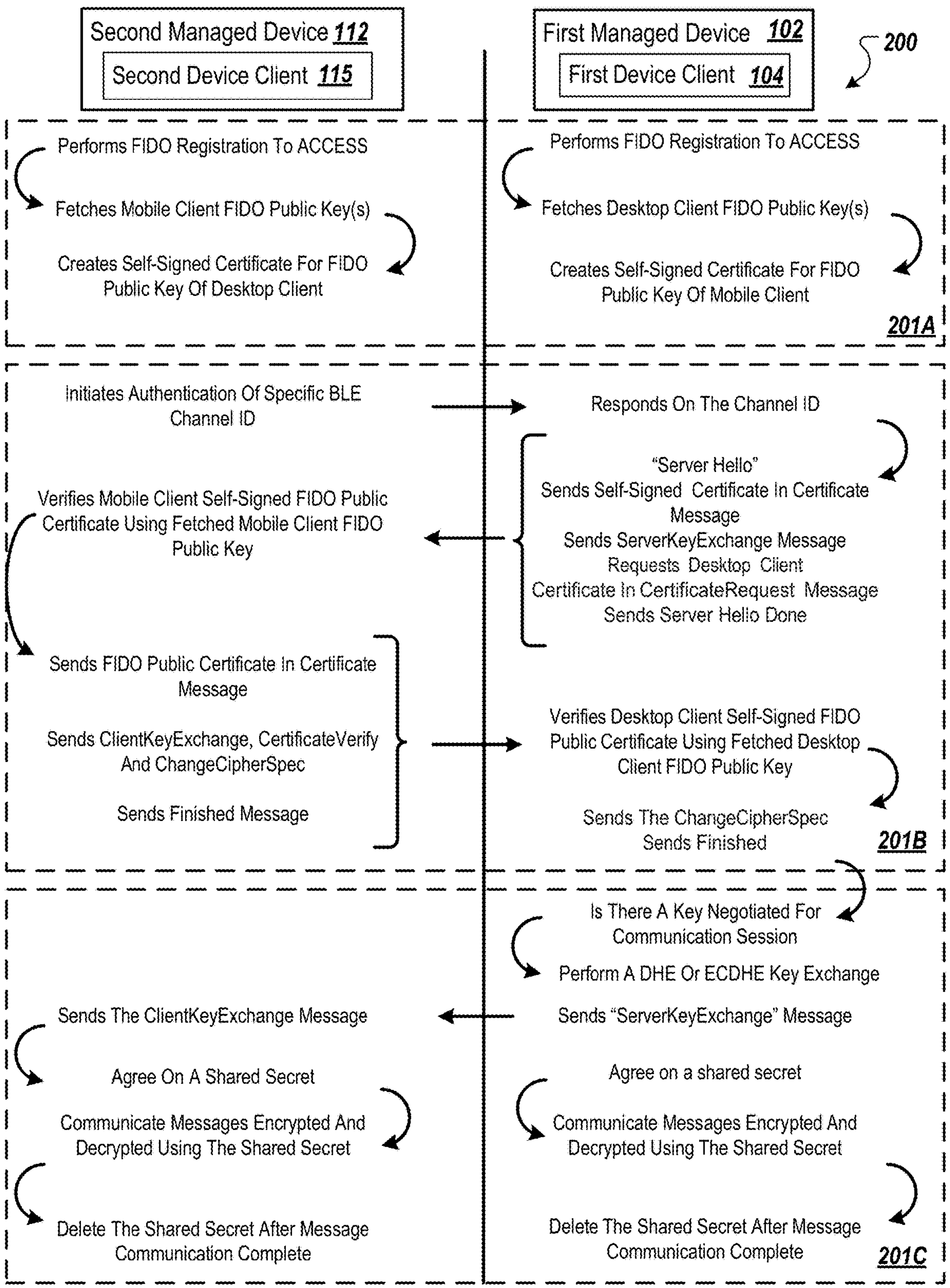
FIG. 2 is a flow diagram illustrating a communication process that may be implemented in the operating environment of FIG. 1.

FIG. 2 is a flow diagram illustrating a communication process 200 that may be implemented in the operating environment 100 of FIG. 1 or another suitable environment. FIG. 2 includes the second device client 115 and the first device client 104 of FIG. 1. Although not depicted in FIG. 2, communication of data and information may be via a communication interface such as the communication interface 120 of FIG. 1. As described with reference to FIG. 1, the second device client 115 may be included in the second managed device 112 and the first device client 104 may be included in the first managed device 102. In the example of FIG. 2, the second managed device 112 includes a desktop computer and the first managed device includes a mobile device. Accordingly, in FIG. 2, some of the operations are described as "mobile" referring to the first managed device 102 and "desktop" referring to the second managed device. As discussed with reference to FIG. 1, the first and the second managed devices 102 and 112 are associated with the user 113. Additionally, in the depicted embodiment the first and second managed devices 102 and 112 may be Bluetooth enabled and the communication interface may include a Bluetooth or BLE channel.

The communication process 200 may be separated into three parts, generally indicated by 201A-201C. A first part 201A includes steps for preparation to establish the secure communication. A second part 201B includes steps for authentication. A third part 201C includes steps for communication between the clients 104 and 115. In some embodiments, one or more of the parts 201A-201C may be repeated each time the devices 102 and 112 communicate via the communication interface 120. For example, the first part 201A may occur once and the second and third parts 201B and 201C may occur each time the managed devices 102 and 112 communicate.

In the first part 201A, the clients 115 and 104 may prepare for secure communications. The steps in the first part 201A may include performance of a FIDO registration as discussed with reference to FIG. 1. Following the registration, the clients 115 and 104 fetch public keys of the other device. For instance, the second device client 115 may fetch the FIDO public key of the first managed device 102 and the first device client 104 may fetch the FIDO public key of the second managed device 112. The fetched public keys may be stored locally, for instance in secured key storage such as the key storage 110 or 116. Additionally, in the first part 201A of the communication process 200, the clients 104 and 115 create a self-signed certificate. The self-signed certificate may be for the FIDO public key. For instance, the second device client 115 may create a self-signed certificate for the FIDO public key of the desktop client and the first device client 104 may create a self-signed certificate for the FIDO public key of the mobile client.

Following the first part, the managed devices 102 and 112 may have stored the FIDO public key of the other device 102 or 112. Additionally, the managed devices 102 and 112 may have created a self-signed certificate for their FIDO public key.

The second part 201B includes operations through which the managed devices 102 and 112 authenticate one another via the natively unsecured channel. The operations of the second part 201B may enable establishment of a secured communication interface between unpaired Bluetooth™ devices (e.g., the first and second managed devices 102 and 112). The operations of the second part 201B may generally follow and may be similar to and/or formatted according to a Transport Layer Security (TLS) authentication. In some embodiments, the clients 104 and 115 mutually authenticate over the Bluetooth™ channel in the same (or a similar) manner as mutual authentication over TLS.

In the example shown, the second device client 115 initiates mutual authentication over a designated/configured Bluetooth™ channel such as a specific BLE channel ID. In some embodiments, communication may be initiated by the second device client 115 sending a ClientHello message as defined in the TLS mutual authentication protocol (e.g., mTLS).

The first device client 104 listens on the same BLE channel and responds with a "Server Hello" message. The first device client 104 sends its own self-signed public certificate to the second device client 115 over the BLE channel. In some embodiments, the first device client may send the "ServerKeyExchange" message. The first device client 104 requests that the second device client 115 send its FIDO public certificate and (optionally) sends the "ServerHelloDone" message.

The second device client 115 uses the FIDO public key registered previously by first device client 104 and fetched previously (or now, if online) by the second device client 115 to verify the self-signed public certificate received from first device client 104. In response to the verification indicating the self-signed certificate is valid, the second device client 115 sends its self-signed public certificate to the first device client 104. Additionally, if the first device client 104 sent the ServerKeyExchange message, the second device client 115 replies with the ClientKeyExchange message. In some embodiments, one or both of the Client Verify and ChangeCipherSpec messages may also be sent. The second device client 115 ends with a "finished" message.

The first device client 104 verifies the self-signed public certificate received from second device client 115 using the public key previously fetched in the first part 201A. If the verification indicates the self-signed certificate received from second device client 115 is valid, the first device client 104 may (or may not) send the ChangeCipherSpec message, as defined in the TLS mutual authentication protocol. The first device client 104 ends with a "finished" message.

The third part 201C may be performed responsive to completion of the second part 201B. The third part 201C may begin by the first device client 104 determining whether a key has been negotiated for a communication session. Responsive to a determination that the key has not been negotiated, the first device client 104 and the second device client 115 may perform an ECDHE or a DHE key exchange. For instance, the first device client 104 sends a "ServerKeyExchange" message and the second device client 115 sends the "ClientKeyExchange" message. After the key exchange is complete, the clients 104 and 115 agree on a shared secret. The shared secret is then used by the managed devices 102 and 112 to encrypt and decrypt messages during communications over the BLE channel. After the communication ends, the clients 104 and 115 delete the shared secret.

To communicate again in the future, the client 104 and 115 re-perform the second and third parts 201B and 201C to establish a new secure channel, re-authenticate the devices 102 and 112, and agree upon another shared secret.

Figure 3:
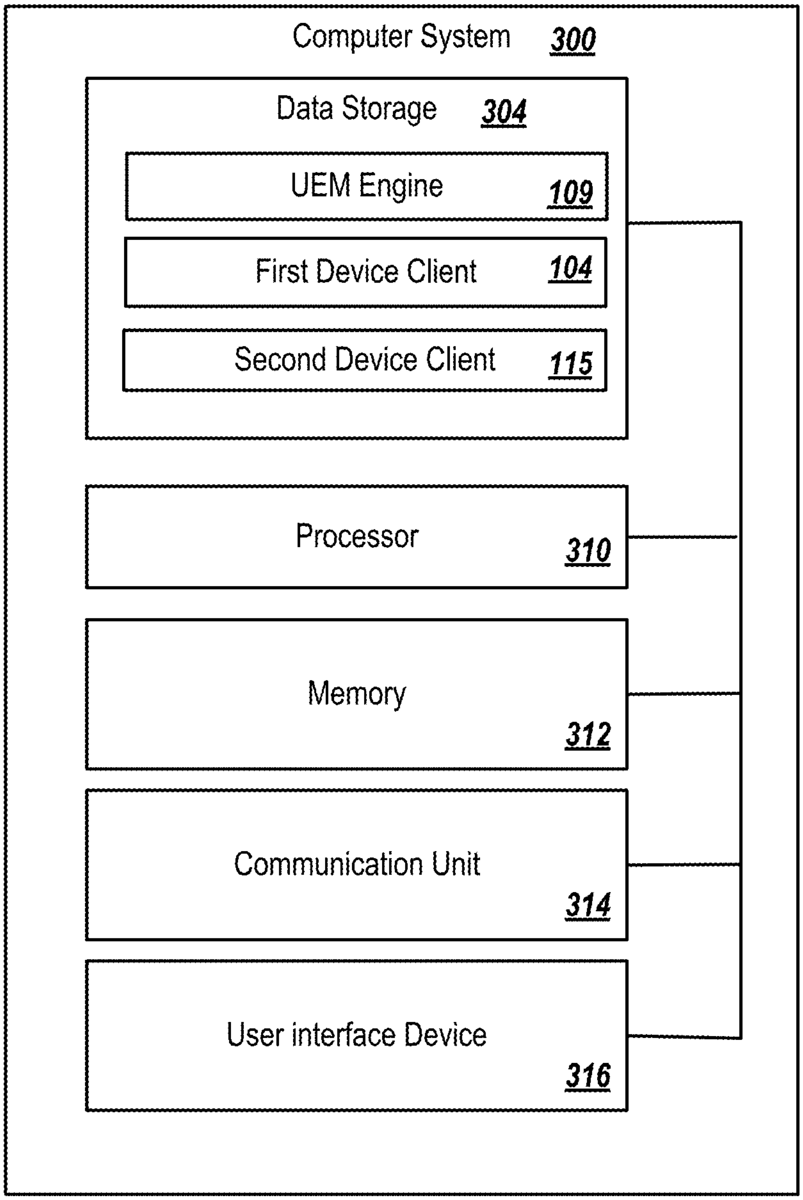
FIG. 3 illustrates an example computer system configured for establishing a secured communication interface between a first managed device and a second managed device.

FIG. 3 illustrates an example computer system 300 configured for establishing secured communication interface between a first managed device and a second managed device, according to at least one embodiment of the present disclosure. The computer system 300 may be implemented in the operating environment 100 of FIG. 1, for instance. Examples of the computer system 300 may include the managed devices 102 and 112, the access server 106, the UEM device 114, or some combination thereof. The computer system 300 may include one or more processors 310, a memory 312, a communication unit 314, a user interface device 316, and a data storage 304 that includes the UEM engine 109, the first device client 104, the second device client 115, or some combination thereof (collectively modules 301).

The processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 3, the processor 310 may more generally include any number of processors configured to perform individually or collectively any number of operations described in the present disclosure. Additionally, one or more of the processors 310 may be present on one or more different electronic devices or computing systems. In some embodiments, the processor 310 may interpret and/or execute program instructions and/or process data stored in the memory 312, the data storage 304, or the memory 312 and the data storage 304. In some embodiments, the processor 310 may fetch program instructions from the data storage 304 and load the program instructions in the memory 312. After the program instructions are loaded into the memory 312, the processor 310 may execute the program instructions.

The memory 312 and the data storage 304 may include computer-readable storage media for carrying or having computer-executable instructions or data structures stored thereon. Such computer-readable storage media may include any available media that may be accessed by a general-purpose or special-purpose computer, such as the processor 310. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 310 to perform a certain operation or group of operations.

The communication unit 314 may include one or more pieces of hardware configured to receive and send communications. In some embodiments, the communication unit 314 may include one or more of an antenna, a wired port, and modulation/demodulation hardware, among other communication hardware devices. In particular, the communication unit 314 may be configured to receive a communication from outside the computer system 300 and to present the communication to the processor 310 or to send a communication from the processor 310 to another device or network (e.g., 108 of FIG. 1).

The user interface device 316 may include one or more pieces of hardware configured to receive input from and/or provide output to a user. In some embodiments, the user interface device 316 may include one or more of a speaker, a microphone, a display, a keyboard, a touch screen, or a holographic projection, among other hardware devices.

The modules 301 may include program instructions stored in the data storage 304. The processor 310 may be configured to load the modules 301 into the memory 312 and execute the modules 301. Alternatively, the processor 310 may execute the modules 301 line-by-line from the data storage 304 without loading them into the memory 312.

Modifications, additions, or omissions may be made to the computer system 300 without departing from the scope of the present disclosure. For example, in some embodiments, the computer system 300 may not include the user interface device 316. In some embodiments, the different components of the computer system 300 may be physically separate and may be communicatively coupled via any suitable mechanism. For example, the data storage 304 may be part of a storage device that is separate from a device, which includes the processor 310, the memory 312, and the communication unit 314, that is communicatively coupled to the storage device. The embodiments described herein may include the use of a special-purpose or general-purpose computer including various computer hardware or software modules, as discussed in greater detail below.

Figure 4:
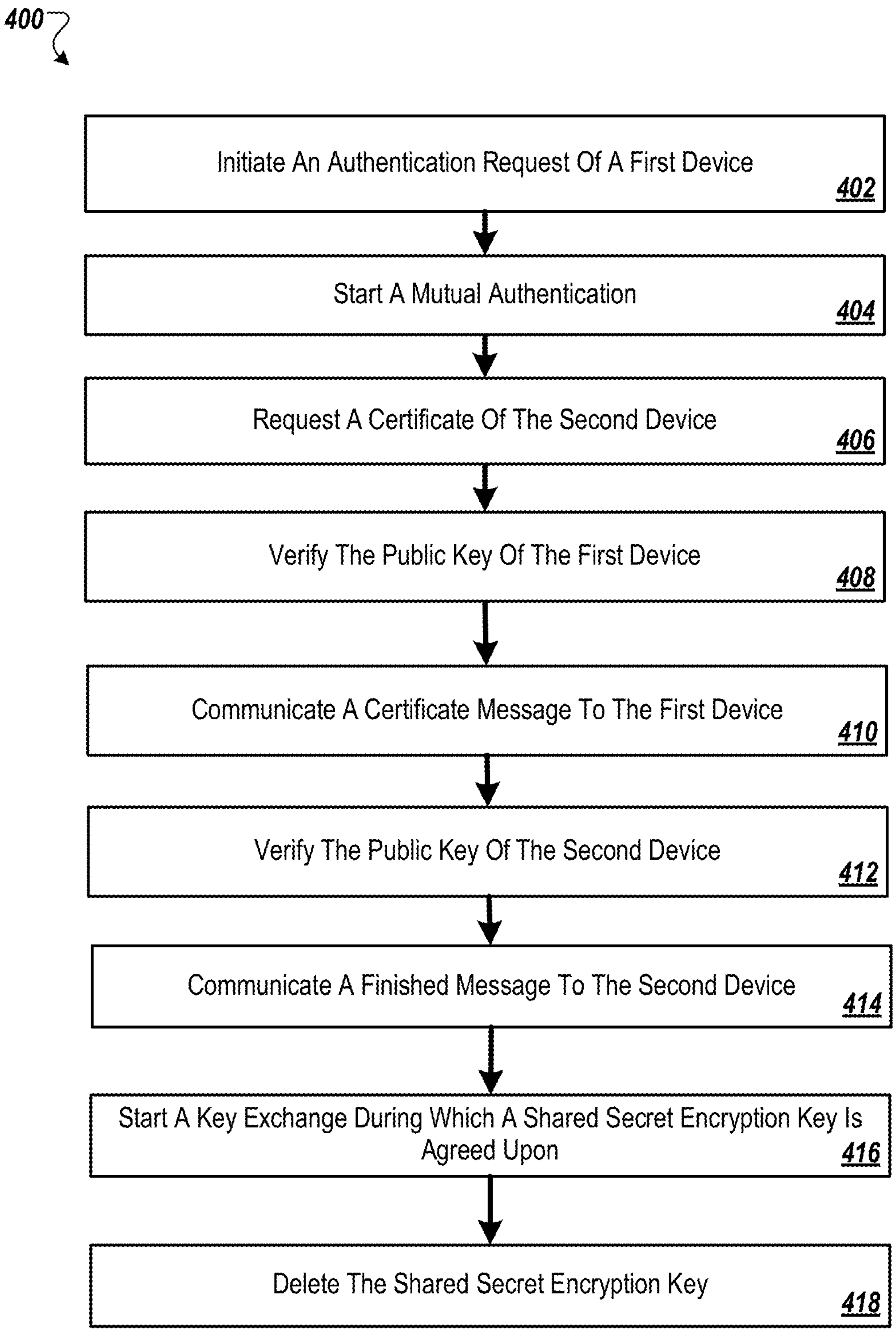
FIG. 4 is a flow chart of an example method of establishing a secured communication interface between a first managed device and a second managed device.

FIG. 4 is a flow chart of an example method 400 of establishing a secured communication interface between a first managed device and a second managed device, according to at least one embodiment of the present disclosure. The first and second managed devices implementing the method 400 may be associated with a single user such as the first and second managed devices 102 and 112 of FIG. 1 or clients thereof. The method 400 may be performed while the first and second managed devices are offline or using the secured communication interface as a primary communication interface.

The method 400 may begin at block 402 in which an authentication request of a first managed device may be initiated. The authentication request may be initiated by a second managed device on a wireless channel. The wireless channel includes a wireless communication channel that is not natively secure. In some embodiments, the first managed device and the second managed device are an unpaired set of devices registered to a single user. In some embodiments, the initiating the authentication request of the first managed device occurs when one or both of the first managed device and the second managed device is not connected to the Internet or another suitable communication network. For instance, in these and other embodiments, the first managed device includes a mobile device of the user and the second managed device includes a desktop device of the user.

Additionally, in some embodiments, the wireless communication channel may include a specific Bluetooth™ Low Energy (BLE) channel, which may be associated with a BLE channel identifier. In these and other embodiments, the first managed device may be configured to listen on the BLE channel and to respond to initiation of communication by the second managed device.

At block 404, a mutual authentication process may be started. The mutual authentication process may be started by the first managed device over the wireless channel. The mutual authentication process may be started responsive to the authentication request (e.g., block 402). The mutual authentication process may be started by communication of a certificate message. The certificate message may have a mobile signing key (MSK) that includes a public key of the first managed device. The public key of the first managed device, which may have been assigned during a passwordless authentication registration process. Additionally, the public key of the first managed device may be self-signed. In some embodiments, the passwordless authentication registration process includes a fast identity online (FIDO) process.

At block 406, a certificate of the second managed device may be requested. The certificate of the second managed device may be requested by the first managed device. At block 408, the public key of the first managed device may be verified. The public key of the first managed device may be verified by the second managed device. In some embodiments, verification of the public key of the first managed device is based on availability of the public key of the first managed device on or at the second managed device. For instance, the public key of the first managed device may be fetched by the second managed device from a unified endpoint management (UEM) management device following the passwordless authentication registration process. Availability of the public key of the first managed device and the self-signed certificate may enable verification of the self-signed public key of the first managed device.

At block 410, a certificate message may be communicated to the first managed device. The certificate message may be communicated by the second managed device to the first managed device after the public key of the first managed device is verified by the second managed device. The certificate message includes a public key of the second managed device that is self-signed by the second managed device.

At block 412, the public key of the second managed device may be verified by the first managed device. Similar to verification described in block 408, verification of the public key of the second managed device is based on availability of the public key of the second managed device on or at the first managed device because the public key of the second managed device has been fetched by the first managed device from the UEM management device following the passwordless authentication registration process. The availability of the public key of the second managed device at the first managed device enables verification of the self-signed public key.

At block 414, a finished message may be communicated. The finished message may be communicated after the public key of the second managed device is verified by the first managed device. At block 416, a key exchange may be started. During the key exchange, a shared secret encryption key may be agreed upon between the first managed device and the second managed device. The shared secret encryption key is used to encrypt and decrypt data communication messages between the first and second managed devices. In some embodiments, the key exchange includes a Diffie-Hellman key (DHE) key exchange. After the shared secret encryption key is agreed upon, messages communicated between the first and second managed devices may be encrypted and decrypted using the encryption key. The messages may be communicated via the communication interface of block 402.

At block 418, the shared secret encryption key may be deleted. The shared secret encryption key may be deleted by the first and the second managed devices after communication between the first and second managed devices ends. In some embodiments, one or more of blocks 402, 404, 406, 408, 410, 412, 414 may be performed according to the Transport Layer Security (TLS) protocol. For instance, the authentication request includes a client hello message formatted according to a TLS protocol.

Modifications, additions, or omissions may be made to the method 400 without departing from the scope of the present disclosure. For example, in some embodiments, the method 400 may include invalidating one or more public keys based at least in part on an amount of time in offline mode. Invalidation of the public key(s) may be performed to provide additional security if the first or second managed devices are offline for an extended period. In these and other embodiments, the public key of another device or client registered to the same user may be invalidated after a prolonged period of being offline. For instance, the method 400 may include monitoring to detect if/when one or both of the first and second managed devices is in an offline mode. If one or both of the devices is determined to be offline, a timer is started. If the timer expires prior to the device being back online, it is determined at 408 that the previously fetched public key(s) of other devices registered to the same user are to be expired or invalid. If prior to the key expiration timer expiring the device is determined to be back online (i.e., connected to the network 108 and/or UEM device 114 of FIG. 1), the monitoring continues process until the device is shut down.

The method 400 may be performed in a suitable operating environment such as the operating environment 100 of FIG. 1. The method 400 may be performed by the managed devices 102 and 112 or clients 104 and 115 thereon described elsewhere in the present disclosure or by another suitable computing system, such as the computer system 300 of FIG. 3. In some embodiments, the managed devices 102 and 112 or the other computing system may include or may be communicatively coupled to a non-transitory computer-readable medium (e.g., the memory 312 of FIG. 3) having stored thereon programming code or instructions that are executable by one or more processors (such as the processor 310 of FIG. 3) to cause a computing system or the managed devices 102 and 112 to perform or control performance of the method 400. Additionally or alternatively, the managed devices 102 and 112 may include the processor 310 that is configured to execute computer instructions to cause the managed devices 102 and 112 or another computing systems to perform or control performance of the method 400. The managed devices 102 and 112 or the computer system 300 implementing the methods 500 and 600 may be included in a cloud-based managed network, an on-premises system, or another suitable network computing environment. Although illustrated as discrete blocks, one or more blocks in FIG. 4 may be divided into additional blocks, combined into fewer blocks, or eliminated, depending on the desired implementation.

FIGS. 5-10B relate to techniques to securely store a device password, such as the password required to access and use a desktop or laptop computer or other password protected device (collectively referred to herein as "desktop device" and/or "password protected device"), on the device itself. Examples of a password protected device include, without limitation, a desktop or laptop computer that is managed by a Unified Endpoint Management (UEM) or similar security solution. In various embodiments, a mobile device, such as a mobile smart phone, completed FIDO registration with a Relying Party server. In some embodiments, the Relying Party Server comprises a security proxy server or other server used to provide secure access to resources via the mobile device. The Relying Party Server may be managed by an Enterprise Mobility Management (EMM) provider that manages the mobile device. The desktop device (i.e., password protected device) likewise performs FIDO registration with the same Relying Party using the same User Identity as the mobile device. The desktop device obtains a list of public keys registered with the Relying Party using that same User Identity. The desktop device uses a public encryption key it generated for the purpose to encrypt the device password set by the user. The encrypted password is stored securely on the device. The device uses the public encryption key it registered with the Relying Party to perform a first level of encryption of the key used to encrypt the password, then further encrypts the result using the public key registered by the mobile device with the Relying Party to generate a doubly encrypted password encryption key, which is stored securely on the device. Later, to provide access to the device, the device sends the doubly encrypted password encryption key to the Relying Party server, which interacts with the mobile device to perform a first decryption of the doubly encrypted password encryption key to produce a singly encrypted password encryption key. The singly encrypted password encryption key is returned to the device, which uses the public key it registered with the Relying Party to decrypt the password encryption key, which in turn is used to decrypt the encrypted device password to obtain the device password and provide access to the device.

Figure 5:
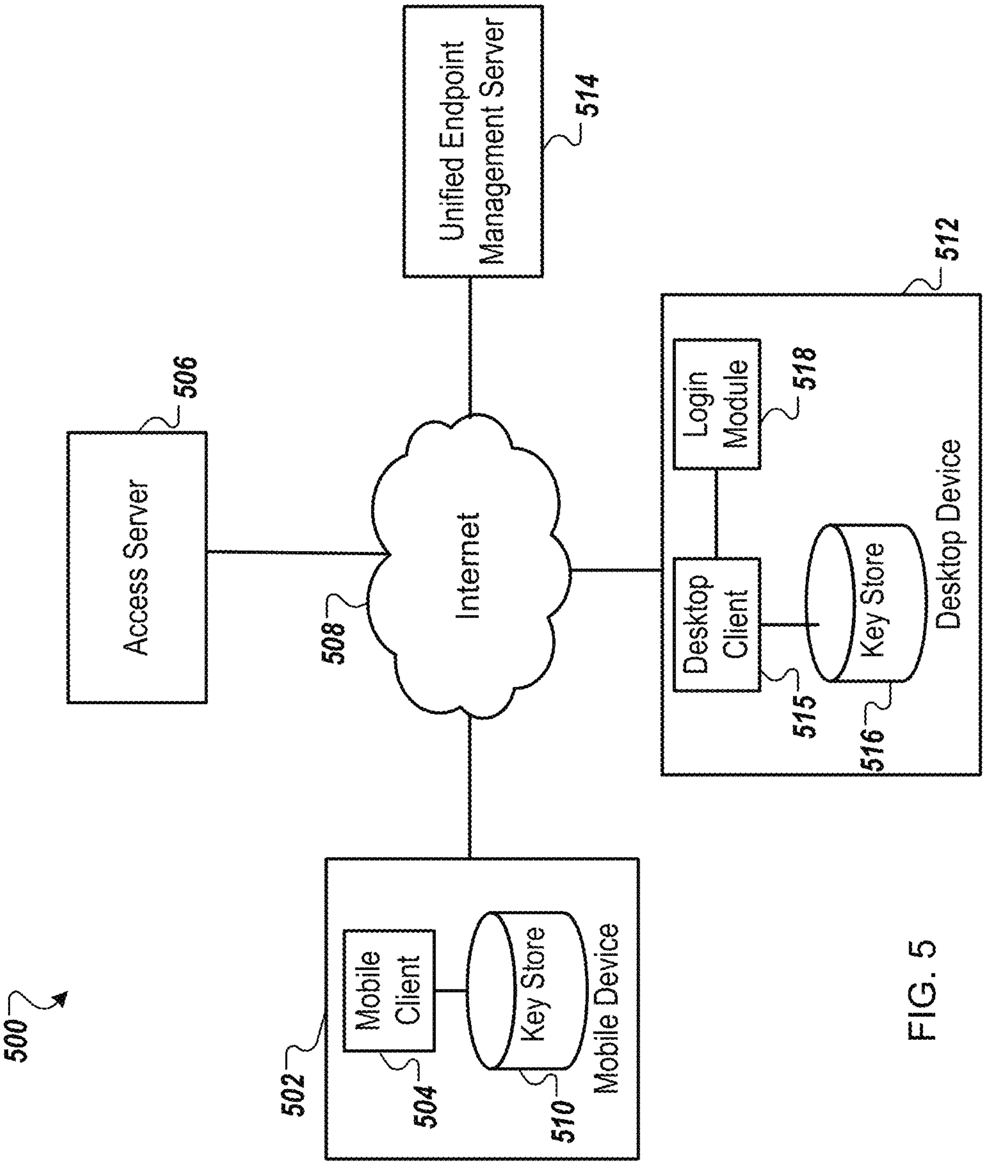
FIG. 5 is a block diagram illustrating an embodiment of a system to securely store a device password.

FIG. 5 is a block diagram illustrating an embodiment of a system 500 to securely store a device password. In the example shown, system 500 includes a mobile device 502 that has a mobile client 504 installed. The mobile client 504 may comprise and/or otherwise be associated with an enterprise mobility management (EMM) or other management agent installed on mobile device 502 and used to manage and secure the mobile device 502. In various embodiments, mobile client 504 is configured to function and serve as one or both of a FIDO Authenticator and a FIDO Client. A FIDO Authenticator generates user credentials having both a public and a private key component. The public key is shared with a service with which FIDO registration is being performed, while the private key is kept secret by the FIDO Authenticator. A FIDO Client interacts with a FIDO Authenticator as needed to generate, store, and retrieve credentials, and formats and sends/receives messages to/from a FIDO Relying Party server to perform FIDO Registration according to applicable FIDO protocols.

In various embodiments, mobile client 504 on mobile device 502 communicates with a Relying Party server 506, denominated an "access" server in FIG. 5, via the Internet 508 according to applicable FIDO protocols to generate credentials comprising a public and private signing key pair and a public and private encryption key pair; register the public signing key and the public encryption key with the Relying Party server 506 as being associated with a User Identity with which the mobile device 502 is associated; and securely store the private signing key and the private encryption key in a secure key store 510, e.g., Keychain™ for macOS™ or Certificate Store™ for Windows™. In some embodiments, the mobile client 504 sends the public encryption key of the encryption key pair to the Relying Party server 506 as a custom attribute in the client data portion of a Web Authorization (WebAuthn) Make Credential Response message.

Referring further to FIG. 5, in the example shown, a desktop device 512 associated with a same user as the mobile device 502 is managed by a Unified Endpoint Management provider via a UEM server 514. The UEM server 514 may be configured to manage the installation and removal of authorized applications and other software on desktop device 512; detect and prevent or remediate by removal attempts to install unauthorized software; detect and respond to the presence or attempts to install malicious or otherwise unauthorized software; prevent, detect, and respond to successful or attempted efforts to gain unauthorized access to the desktop device 512; detect unauthorized sending of protected data from desktop device 512; detect behavioral changes that suggest compromise and/or unauthorized use of the desktop device 512; detect that the device is "jailbroken" or otherwise in a vulnerable state; etc.

In the example shown, UEM server 514 has installed on desktop device 512 a desktop client 515. In various embodiments, the desktop client 515 is provided by and/or otherwise associated with and/or trusted by a Relying Party with which Relying Party server 506 is associated. In some embodiments, the Relying Party may comprise an EMM vendor or service provider that manages mobile device 502. In various embodiments, desktop client 515 is configured to function and serve as one or both of a FIDO Authenticator and a FIDO Client. In various embodiments, desktop client 515 communicates with access server 506 via the Internet 508 according to applicable FIDO protocols to register credentials with access server 506. Private keys generated by desktop client 515 are stored securely in key store 516, such as Keychain™ for macOS™ or Certificate Store™ for Windows™.

In various embodiments, at registration time the desktop client 515 generates a signing key pair and an encryption key pair. The public signing key and public encryption key are registered with the Relying Party, i.e., access server 506. In some embodiments, the desktop client 515 sends the public encryption key of the encryption key pair to the Relying Party server 506 as a custom attribute in the client data portion of a Web Authorization (WebAuthn) Make Credential Response message.

In the example shown, desktop device 512 includes a login module 118 to which a user-defined device password must be provided to gain access to the desktop device 512. In various embodiments, once the desktop client 515 has registered with the Relying Party via access server 506, the desktop client 515 fetches from the access server 506 the public key of the mobile device encryption key pair generated and registered by mobile device 502. In various embodiments, the access server 506 uses a user identity associated with desktop client 515 and/or desktop device 512 to find the corresponding public mobile encryption key associated with the same user identity, in this example mobile device 502.

The desktop client 515 generates a Password Encryption Key (PEK), e.g., a symmetric key that will be used to encrypt/decrypt the device password (i.e., the password that is required to be provided to login module 118, in this example, to gain access to and use the desktop device 512. The desktop client 515 uses the PEK to encrypt the device password and stores the encrypted device password in key store 516 or other secure storage, such as Keychain™ for macOS™ or Certificate Store™ for Windows™.

The desktop client 515 encrypts the PEK with the public desktop encryption key (DEK) it registered with the access server 506 to produce an encrypted password encryption key (EPEK). The desktop client 515 uses the public mobile encryption key (MEK) it fetched from access server 506, i.e., the encryption key registered by mobile device 502, as described above, to perform a second level of encryption on the EPEK to produce a doubly encrypted password encryption key (EPEK2). The doubly encrypted password encryption key is stored in key store 516 and/or another secure location, such as Keychain™ for macOS™ or Certificate Store™ for Windows™.

Since the private mobile encryption key generated by mobile device 502 is required to decrypt the EPEK2 and the private mobile encryption key is not stored on desktop device 512, the EPEK2 cannot be decrypted and used even if the desktop device 512 is breached and/or compromised.

To provide access to desktop device 512, e.g., in response to user interaction with a login/lock screen of desktop device 512, the desktop client 515 fetches a FIDO authentication challenge from access server 506. Upon receiving the challenge, desktop client 515 prepares a FIDO authentication response, such as a WebAuthn Get Assertion Response. In various embodiments, the desktop client 515 includes the doubly encrypted password encryption key (EPEK2) in its response, e.g., as a custom field in the client data of a WebAuthn Get Assertion Response. The access server 506 verifies the FIDO authentication response using the public signing key registered previously by the desktop client 515, as described above; extracts the EPEK2 from the response; and sends a notification to the mobile device 502, e.g., based on the mobile device 502 having registered with the access server 506 in the context of a same user identity as the desktop client 515 and/or associated desktop device 512.

In various embodiments, mobile client 504 on mobile device 502 receives the notification, and once the user approves the notification and passes the biometric challenge on the mobile device 502 (e.g., facial, fingerprint, and/or voice recognition), mobile client 504 fetches the doubly encrypted password encryption key (EPEK2) and a FIDO authentication challenge from the access server 506. Upon receiving the EPEK2, the mobile client 504 uses the private key of the mobile encryption key pair it registered with the access server 506 to perform a first level of decryption on the EPEK2 to produce the singly encrypted password encryption key (EPEK). The mobile client 504 prepares and sends to access server 506 a FIDO authentication response, e.g., a WebAuthn Get Assertion Response, that includes the EPEK, e.g., as a custom field in client data of the WebAuthn Get Assertion Response. The mobile client 504 signs the FIDO authentication response with the private signing key of the mobile signing key pair it registered with access server 506, as described above.

The access server 506 uses the public signing key registered by mobile client 504 to verify the response and extracts the EPEK from the response. Access server 506 sends a "success" response to desktop client 515 and includes the EPEK in the response body.

Desktop client 515 extracts the EPEK from the response and performs a second level of decryption using the private key of the desktop encryption key pair it registered previously with access server 506, as described above, to retrieve the password encryption key (PEK), which desktop client 515 then uses to decrypt the desktop password. The desktop client 515 passes the decrypted desktop password to login module 118, which in response provides access to desktop device 512.

Figure 6:
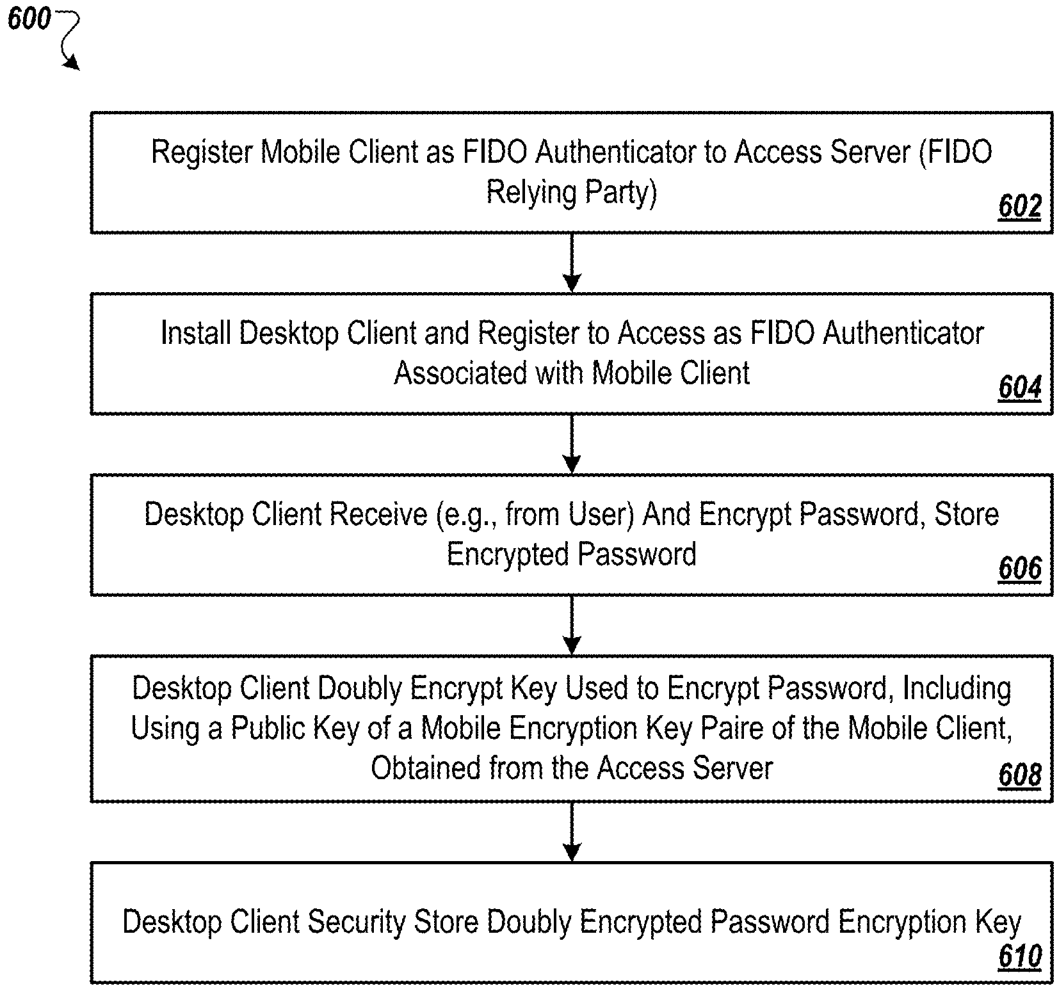
FIG. 6 is a flow diagram illustrating an embodiment of a process to securely store a device password.

FIG. 6 is a flow diagram illustrating an embodiment of a process to securely store a device password. In various embodiments, the process 600 of FIG. 6 is performed by one or more of a mobile device and a desktop device associated with a same user identity, such as one or more of mobile device 502, mobile client 504, desktop device 512, and desktop client 515. In the example shown, at 602 a mobile client, such as mobile client 504 of FIG. 5, is registered as a FIDO Authenticator to a Relying Party, e.g., access server 506 of FIG. 5. At 604, a desktop client is installed on a desktop device, such as desktop client 515 on desktop device 512 in the example shown in FIG. 5, and the desktop client is registered as a FIDO Authenticator to the same Relying Party and as being associated with a same user identity as the mobile device/client. At 606, the desktop client receives, e.g., from a user via a user interface, a device password; generates and uses a password encryption key (PEK) to encrypt the password; and securely stores the encrypted password. At 608, the desktop client doubly encrypts the PEK, e.g., as described above, using for a first level of encryption a public key of a desktop encryption key pair the desktop client registered with the access server and for a second level of encryption a public key of a mobile encryption key pair registered with the access server by the mobile device/client to produce a doubly encrypted password encryption key (EPEK2). At 610, the desktop client securely stores the doubly encrypted password encryption key on the desktop device.

Figure 7:
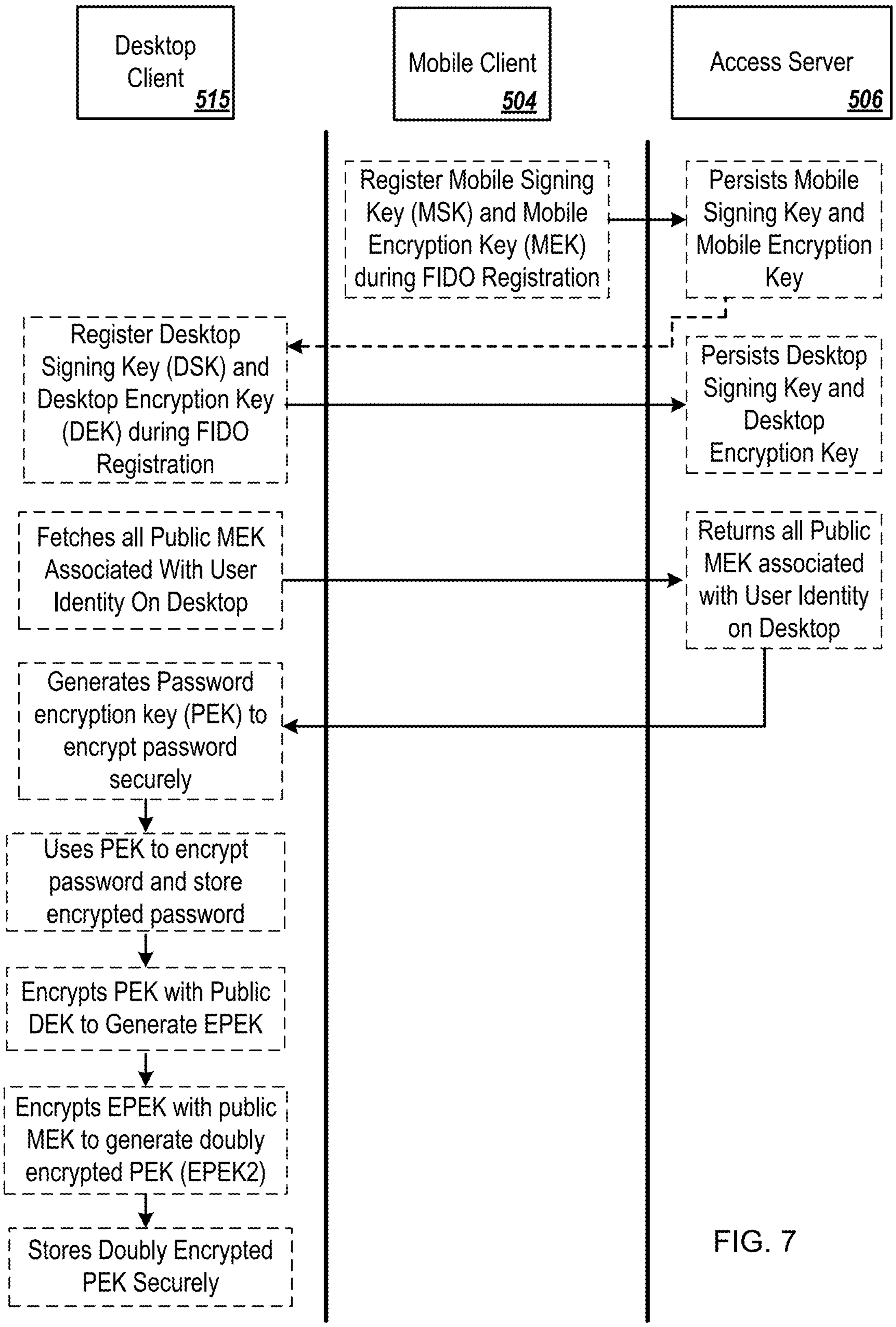
FIG. 7 is a call flow diagram illustrating an embodiment of a process to securely store a device password.

FIG. 7 is a call flow diagram illustrating an embodiment of a process to securely store a device password. In various embodiments, the example shown in FIG. 7 illustrates the actions performed by and communications sent between the desktop mobile client 504, access server 506, and desktop client 515 to register keys and to generate and store the doubly encrypted password encryption key (EPEK2), for example as described above in connection with FIGS. 5 and 6.

Accordingly, FIG. 7 depicts an example process of registration and password encryption. In the first portion, the mobile client 504 has already registered as a FIDO Authenticator to the access server 506 (Relying Party). The mobile client 504 serves a role of FIDO client and FIDO Authenticator. The mobile client public key of a signing key pair is registered to the access server 506 as the mobile signing key (MSK). The Mobile Client's Public Key of the Encryption Key Pair is registered to access server 506 as the mobile encryption key (MEK). The public key of Encryption Key Pair (MEK) is sent as part of Registration Response of a Webauthn Make Credential. It is sent as a custom attribute in client data of a Webauthn Make Credential Response.

The desktop client 515 is installed on the desktop device and is registered with the help of the registered mobile client. The desktop client 515 serves a role of FIDO Client and FIDO Authenticator. The desktop client's public key of signing key pair is registered to the access server 506 as a desktop signing key (DSK). The desktop client's public key of the encryption key pair is registered to the access server 506 as a desktop encryption key (DEK). The public key of encryption key pair (DEK) is sent as part of a registration response of Webauthn Make Credential. It is sent as a custom attribute in client data of Webauthn Make Credential Response.

Once registration of the desktop client 515 succeeds, it will encrypt the desktop password provided by user. The desktop client will fetch the public key of mobile encryption key Pair (MEK) from the access server 506. The desktop client 515 will generate a password encryption key (PEK), which will be a symmetric key and will be used to encrypt/decrypt the password (the PEK). The desktop client will save the encrypted password in some secure location like Keychain for macOS or Certificate Store in Windows. The desktop client 515 will encrypt the password encryption key (PEK) with the public key of the desktop encryption key (DEK) to generate an encrypted password encryption key (EPEK), that is DEK [PEK]→EPEK. The desktop client 515 will encrypt the EPEK with the MEK to generate a doubly encrypted password encryption key (EPEK2), that is MEK [EPEK]→EPEK2. The desktop client 515 will save the EPEK2 in some secure location like Keychain for macOS or Certificate Store in Windows.

Figure 8:
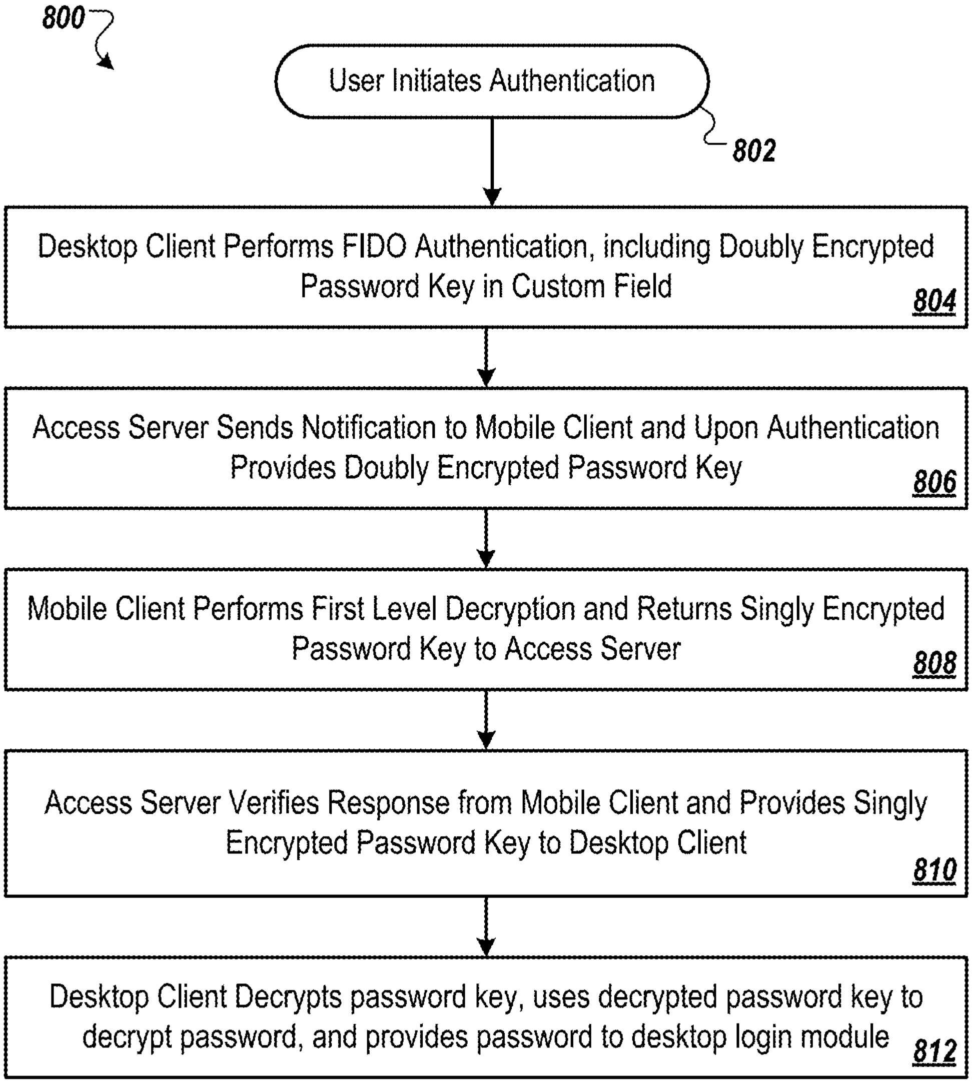
FIG. 8 is a flow diagram illustrating an embodiment of a process to access and use a device password that has been stored securely on the device.

FIG. 8 is a flow diagram illustrating an embodiment of a process to access and use a device password that has been stored securely on the device as disclosed herein. In various embodiments, the process 800 of FIG. 8 is performed by one or more of a mobile device, a desktop device associated with a same user identity as the mobile device, and a relying party server, such as one or more of mobile device 502, mobile client 504, desktop device 512, desktop client 515, and access server 506 of FIG. 5. In the example shown, at 802 a user initiates authentication, e.g., by interacting with a login or lock screen of the desktop device. At 804, the desktop client performs FIDO authentication, and includes the doubly encrypted password encryption key (EPEK2) in a response, such as in a custom field of client data in a WebAuthn Make Credential Response. At 806, the access server (or other relying party server) sends a notification to a mobile device associated with a same user identity as the desktop client/request and, upon authentication, provides the doubly encrypted password encryption key (EPEK2) to the mobile client. At 808, the mobile client performs a first level of decryption of the EPEK2, using the private key of the mobile encryption key pair the mobile client registered previously with the access server, and returns the resulting singly encrypted password encryption key (EPEK) to the access server. At 810, the access server verifies the response from the mobile client, extracts the EPEK from the response, and sends the EPEK to the desktop client. At 812, the desktop client decrypts the EPEK, using the private key of the desktop encryption key pair the desktop client registered previously with the access server, to retrieve the device password, which the desktop client then provides to the desktop login module.

Figure 9:
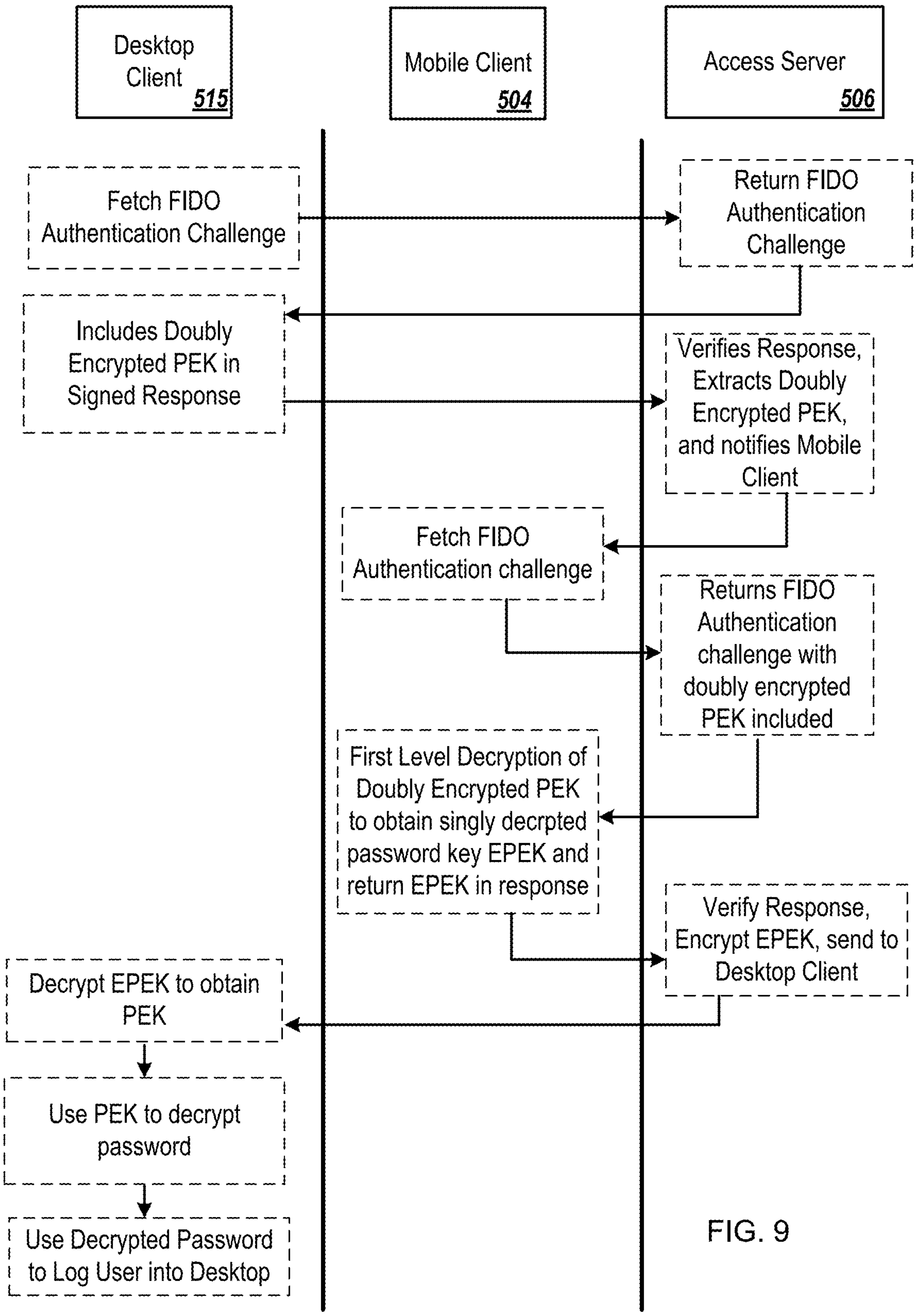
FIG. 9 is a call flow diagram illustrating an embodiment of a process to access and use a device password that has been stored securely on the device.

FIG. 9 is a call flow diagram illustrating an embodiment of a process to access and use a device password that has been stored securely on the device as disclosed herein. In various embodiments, the example shown in FIG. 9 illustrates the actions performed by and communications sent between the desktop mobile client 504, access server 506, and desktop client 515 to retrieve the device password, including by decrypting the doubly encrypted password encryption key (EPEK2), for example as described above in connection with FIGS. 5 and 8.

Accordingly, FIG. 9 illustrates an example process of authentication and password decryption. In it, a user initiates an authentication by interacting with desktop login/lock screen, the desktop client 515 will serve as FIDO authenticator and FIDO client. The desktop client 515 will fetch a FIDO authentication challenge from the access server 506. The desktop client 515 will prepare a FIDO authentication response which would be a Webauthn Get Assertion Response. The desktop client 515 will add the doubly encrypted password encryption key (EPEK2) as a custom field in the client data of Webauthn Get Assertion Response. The desktop client 515 will prepare the digital signature for a FIDO Authentication Response and will use the private key of desktop signing key (DSK) to sign the FIDO Authentication Response.

The desktop client 515 will send the FIDO Authentication Response to the access server 506. The access server 506 will verify the FIDO authentication response from the DSK. The access server 506 will extract the EPEK2 from the FIDO authentication response and will send a notification to the mobile client 504. The mobile client 504 will receive the notification, and once user approves it and passes the biometric challenge on mobile device, the mobile client 504 will fetch the EPEK2 and a FIDO authentication challenge from the access server 506. The mobile client 504 will decrypt the EPEK2 with the MEK to get the encrypted password encryption key (EPEK).

The mobile client 504 will prepare a FIDO authentication response which would be a Webauthn Get Assertion Response. The mobile client 504 will add the EPEK as a custom field in the client data of Webauthn Get Assertion Response. The mobile client 504 will prepare the digital signature for FIDO Authentication Response and will use the private key of mobile signing key (MSK) to sign the FIDO Authentication Response. The mobile client 504 will send the FIDO Authentication Response to the access server 506. The access server 506 will verify the FIDO Authentication Response from the MSK. The access server 506 will extract the EPEK from the FIDO Authentication Response. The access server 506 will send the success response to the desktop client 515 along with the EPEK in the Response body. The desktop client 515 will extract the EPEK from the Response. The desktop client 515 will decrypt the EPEK from the private key of desktop encryption key (DEK) to retrieve the password encryption key (PEK). The desktop client 515 will decrypt the encrypted password from the PEK and will pass to desktop login module for user to log into the desktop device.

Figure 10A:
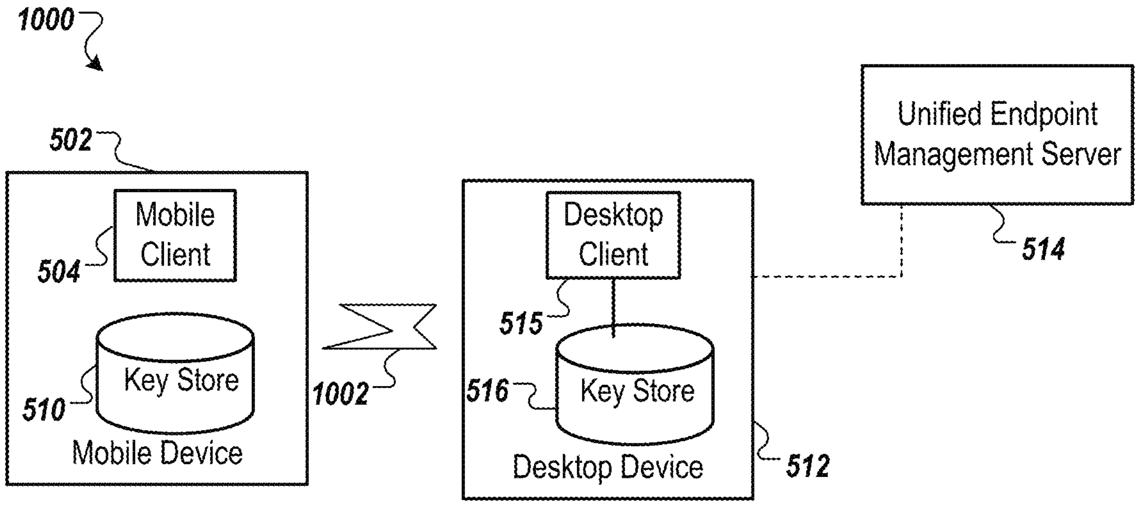
FIG. 10A is a block diagram illustrating an embodiment of a system to securely store a device password in an offline mode.

FIG. 10A is a block diagram illustrating an embodiment of a system to securely store a device password in an offline mode. In the example shown in FIG. 5, for example, the mobile device 502 and desktop device 512, respectively, have access to Internet 508 and are connected via Internet 508 to access server 506. In the system 1000, by comparison, mobile device 502 and desktop device 512 do not have Internet access. In various embodiments, mobile client 504 on mobile device 502 communicates directly with desktop client 515 on desktop device 512 via secure wireless communications 1002, e.g., secure Bluetooth communications. In various embodiments, desktop client 514 fetches from the Relying Party server, such as access server 506 in the example shown in FIG. 5, during a time when the desktop device 512 has access to the Internet 508, a public key of a mobile encryption key pair registered with the Relying Party by the mobile client 504. The desktop client 514 uses the fetched public key of the mobile encryption key pair the mobile client 504 registered with the Relying Party, as described above, to generate a store a doubly encrypted password encryption key (EPEK2).

To provide access to desktop device 512 at a time when the desktop device 512 and/or mobile device 502 are offline, as shown in FIG. 10A, the desktop client 515 sends the EPEK2 to the mobile client 504 via secure wireless communications 1002. The mobile client 504 uses the private key of the mobile encryption key pair it registered with the Relying Party to perform a first level of decryption to retrieve the singly encrypted password encryption key (EPEK), which the mobile client 504 returns to the desktop client 515 via secure communications 1002. The desktop client 515 performs a second level of decryption on the EPEK, using the private key of the desktop encryption key pair it registered with the Relying Party, to retrieve the desktop password. The desktop client 515 provides the desktop password to the login module (not shown in FIG. 10A), which in turn provides access to the desktop device 512.

Figure 10B:
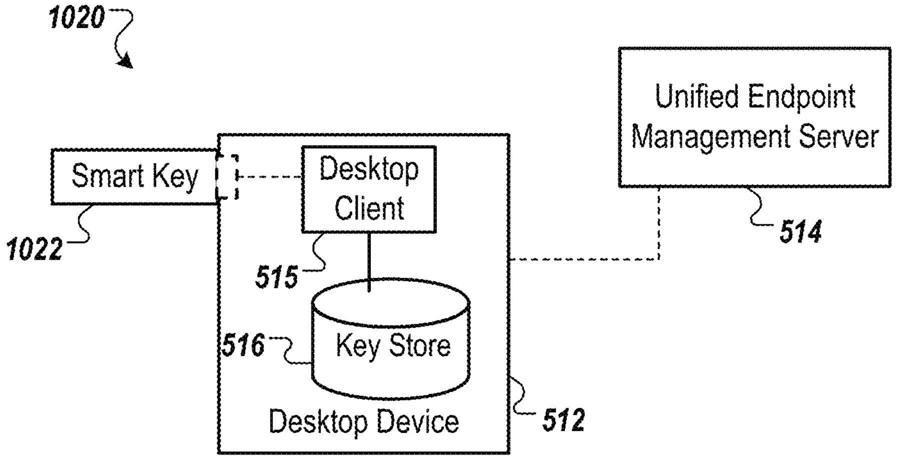
FIG. 10B is a block diagram illustrating an embodiment of a system to securely store a device password using a physical security device.

FIG. 10B is a block diagram illustrating an embodiment of a system to securely store a device password using a physical security device. In the example shown, desktop device 512 is offline and instead of access being provided in offline mode via mobile device 502, as in FIG. 10A, in the example shown in FIG. 10B access is provided via a security key or other smart device 1022 inserted into a port or other structure of desktop device 512. In various embodiments, security key 1022 may include a push button and/or biometric device, such a fingerprint reader, to ensure a user and/or an authorized user is present with the security key 1022.

To provide access, the desktop client 515 sends the EPEK2 to the security key 1022 via an internal communications bus. The security key 1022 uses the private key of a security key encryption key pair registered previously with the Relying Party to perform a first level of decryption to retrieve the singly encrypted password encryption key (EPEK), which the security key 1022 returns to the desktop client 515 via the internal bus. The desktop client 515 performs a second level of decryption on the EPEK, using the private key of the desktop encryption key pair it registered with the Relying Party, to retrieve the desktop password. The desktop client 515 provides the desktop password to the login module (not shown in FIG. 10A), which in turn provides access to the desktop device 512.

In various embodiments, techniques disclosed herein are used to store a device password securely on a device, such as a desktop device, and to provide secure access to the device without requiring the user to enter the device password.

Figure 11:
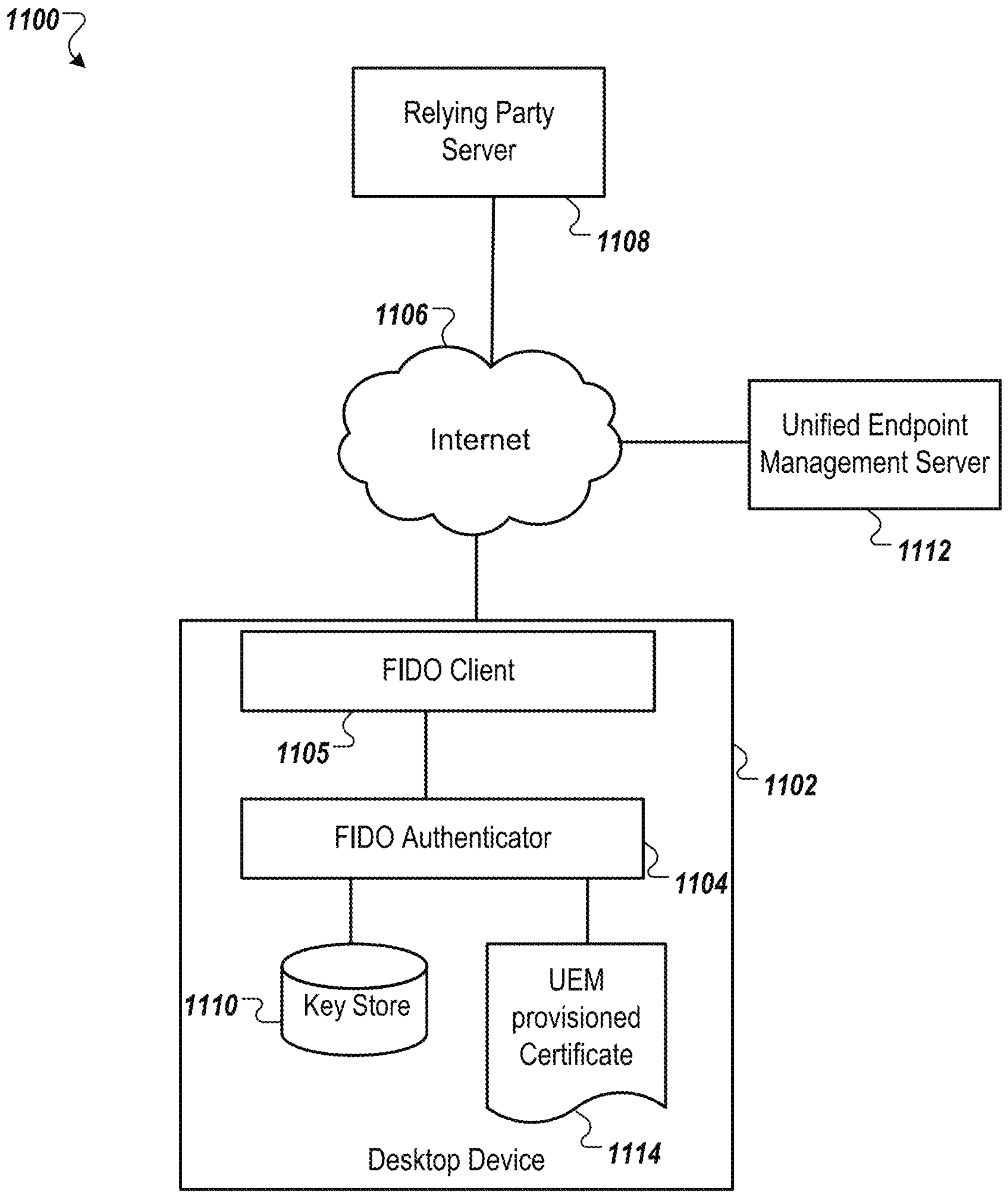
FIG. 11 is a block diagram illustrating an embodiment of a system to verify the hardware source of a FIDO registration.

FIGS. 11-13B relate to techniques to verify a source of a FIDO registration. For example, FIG. 11 is a block diagram illustrating an embodiment of a system to verify the hardware source of a FIDO registration. In the example shown, system 1100 includes a desktop (or other) device 1102 configured to use a soft FIDO Authenticator 1104 and a FIDO client 1105 to perform FIDO registration and/or authentication over the Internet 1106 with a relying party server 1108. The FIDO Authenticator 1104 is configured to store cryptographic keys in a secure key store 1110, e.g., Keychain on a macOS device or Certificate Store on Windows. The device 1102 is managed by a Unified Endpoint Management server 1112. For example, the installation of software on device 1102 may be performed and/or managed by the UEM server 1112, and UEM server 1112 may monitor the security posture of the device 1102 and take responsive action, if needed, in response to detecting security events with respect to device 1102.

A relying party, e.g., one associated with relying party server 1108, may wish to ensure that FIDO registration and/or authentication is performed only with FIDO Authenticators that are installed and running on a managed device that is currently in a secure state. In various embodiments, a Certificate provisioned by UEM server 1112 on device 1102 is used to perform FIDO registration of device 1102 (e.g., a user identity associated with device 1102) with relying party server 1108. The relying party server 1108 is configured to verify and accept the Certificate, and to allow FIDO registration to proceed based on the verification.

Figure 12A:
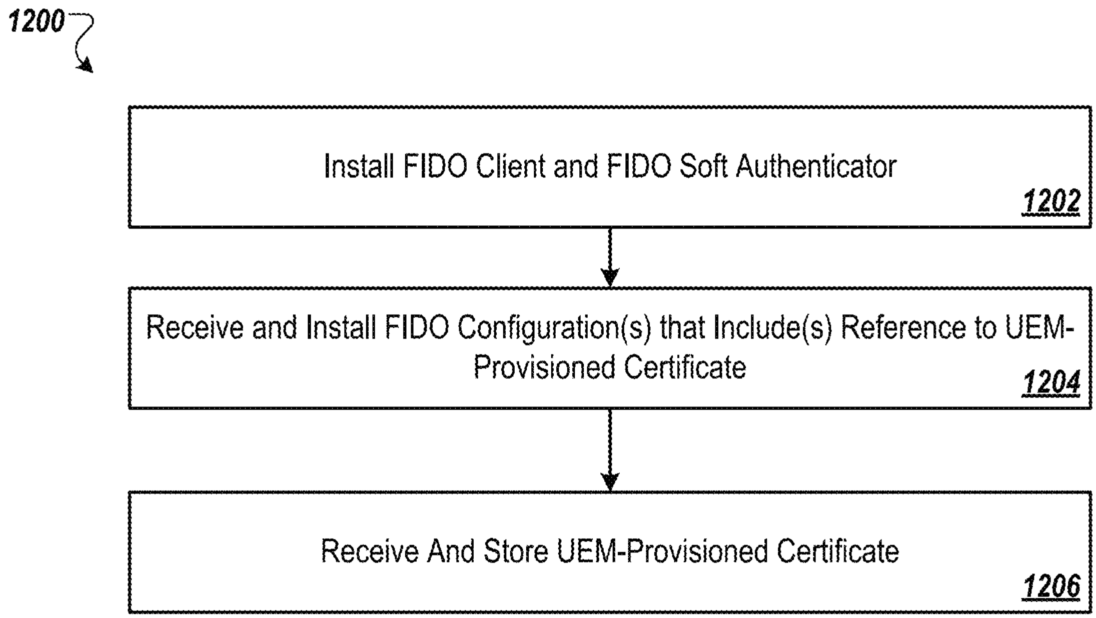
FIG. 12A is a flow diagram illustrating an embodiment of a process to configure a client device to verify the hardware source of a FIDO registration.

FIG. 12A is a flow diagram illustrating an embodiment of a process to configure a client device to verify the hardware source of a FIDO registration. In various embodiments, the process 1200 of FIG. 12A is performed by one or both of a management server, such as UEM server 1112, and a client device, such as device 1102. In the example shown, at 1202, a FIDO Client and FIDO Authenticator are installed. For example, UEM server 1112 may install FIDO Authenticator 1104 and FIDO Client 1105 on device 1102. At 1204, FIDO configuration(s) is/are received and installed, which include a reference to a UEM-provisioned Certificate. At 1206, the UEM-provisioned Certificate indicated by the reference included in the configuration received at 1204 is received and stored. In various embodiments, distribution of the UEM-provisioned Certificate received and stored at 1206, and the receiving and storing, can occur at the time the FIDO Client and FIDO Authenticator are installed and configured (1202, 1204) or at some time prior to or after installation and configuration of the FIDO Client and FIDO Authenticator. In some embodiments, the UEM-provisioned Certificate comprises a Profile Certificate distributed upon registration of the endpoint (e.g., device 1102) to the UEM (e.g., UEM server 1112). In some embodiments, the UEM-provisioned Certificate comprises a new certificate distributed by the UEM (e.g., UEM server 1112) to be used by the soft FIDO Authenticator (e.g., FIDO Authenticator 1104). UEM (e.g., UEM server 1112) to be used by the soft FIDO Authenticator (e.g., FIDO Authenticator 1104).

Figure 12B:
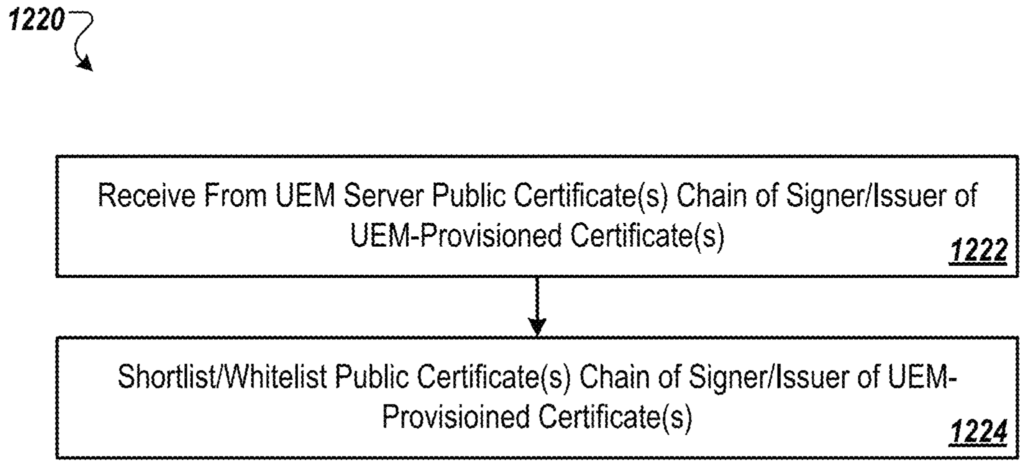
FIG. 12B is a flow diagram illustrating an embodiment of a process to configure a relying party server to verify the hardware source of a FIDO registration.

FIG. 12B is a flow diagram illustrating an embodiment of a process to configure a relying party server to verify the hardware source of a FIDO registration. In various embodiments, the process 1220 of FIG. 12B is performed by a relying party server, such as relying party server 1108. In the example shown, at 1222, a public certificate(s) chain of the signer/issuer of UEM-provisioned certificates, as disclosed herein, is received from the UEM, e.g., UEM server 1112. At 1224, public certificate(s) chain of the signer/issuer of UEM-provisioned certificates received at 1222 is shortlisted/whitelisted at the relying party server, e.g., relying party server 1108.

Figure 13A:
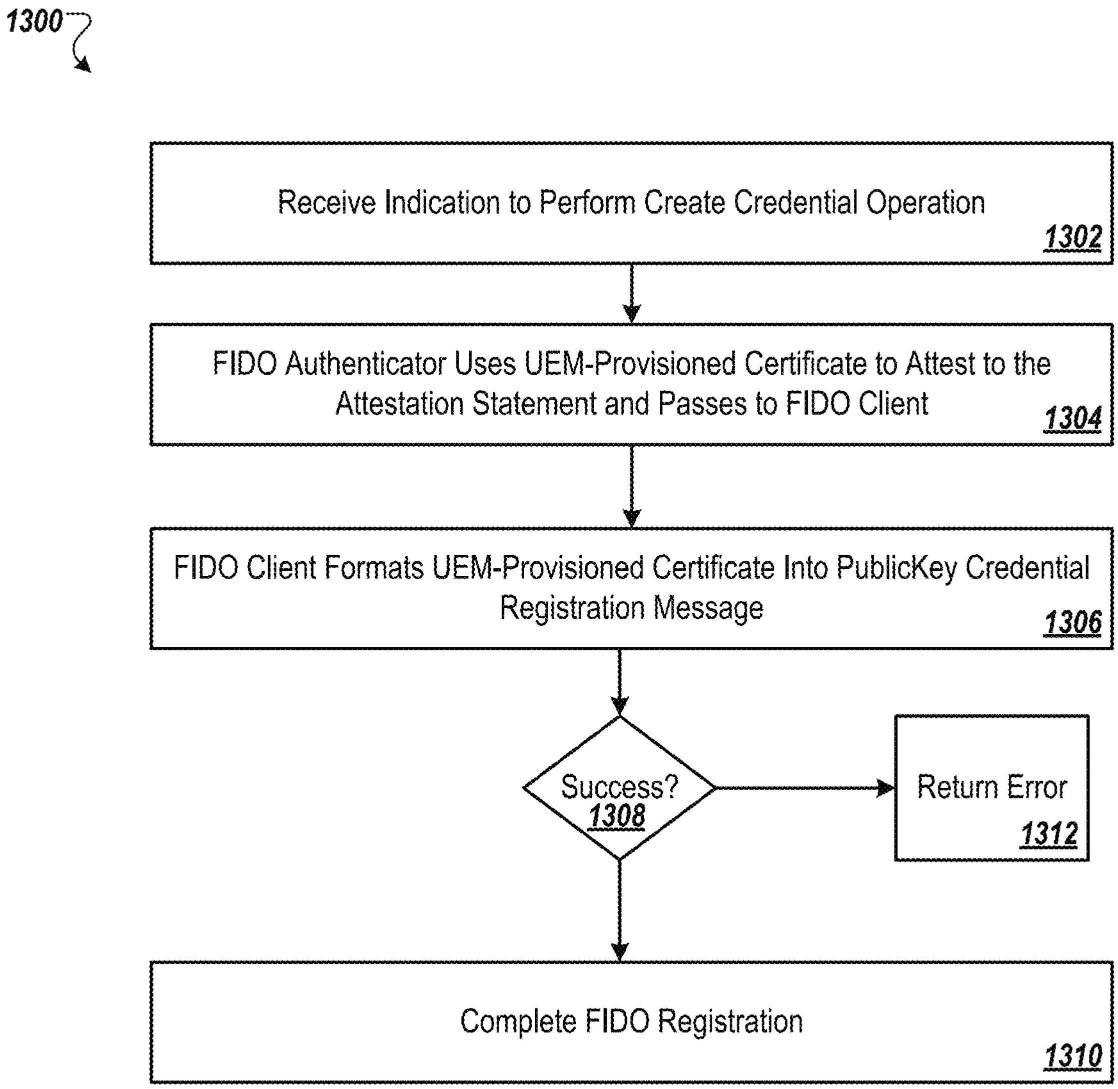
FIG. 13A is a flow diagram illustrating an embodiment of a process to provide verification of the hardware source of a FIDO registration.

FIG. 13A is a flow diagram illustrating an embodiment of a process to provide verification of the hardware source of a FIDO registration. In various embodiments, the process 1300 of FIG. 13A is performed by a FIDO Client and/or a FIDO Authenticator running on a client device, such as FIDO Authenticator 1104 and FIDO Client 1105 on device 1102. In the example shown, at 1302, an indication is received to perform a FIDO Create Credential Operation. For example, a user may launch a relying party application running on the device 1102 or may use a browser to navigate to a service login page associated with the relying party. At 1304, the FIDO Authenticator (e.g., FIDO Authenticator 1104 on device 1102) uses the UEM-provisioned Certificate to attest the attestation statement of the Create Credential Operation and passes the result to the FIDO Client, e.g., FIDO Client 1105. At 1306, the FIDO Client formats the UEM-provisioned Certificate into the PublicKeyCredential Registration Message.

In various embodiments, the API endpoints on the relying party server, e.g., relying party server 1108, may or may not be protected by mutual authentication. In some embodiments, if the API endpoints on the relying party server are protected by mutual authentication, then the FIDO Client uses the UEM-provisioned Certificate to perform the mutual authentication, which will pass because the UEM-provisioned Certificate is shortlisted/whitelisted on the relying party server, as described above.

Referring further to FIG. 13A, at 1308, if the mutual authentication (if required) is completed and the attestation in the PublicKeyCredential Registration Message is verified by the relying party server successful, then at 1310 the FIDO registration is completed. If the mutual authentication (if required) and/or the attestation verification fail (1308), then at 1312 an error is returned and/or other exception handling is performed.

Figure 13B:
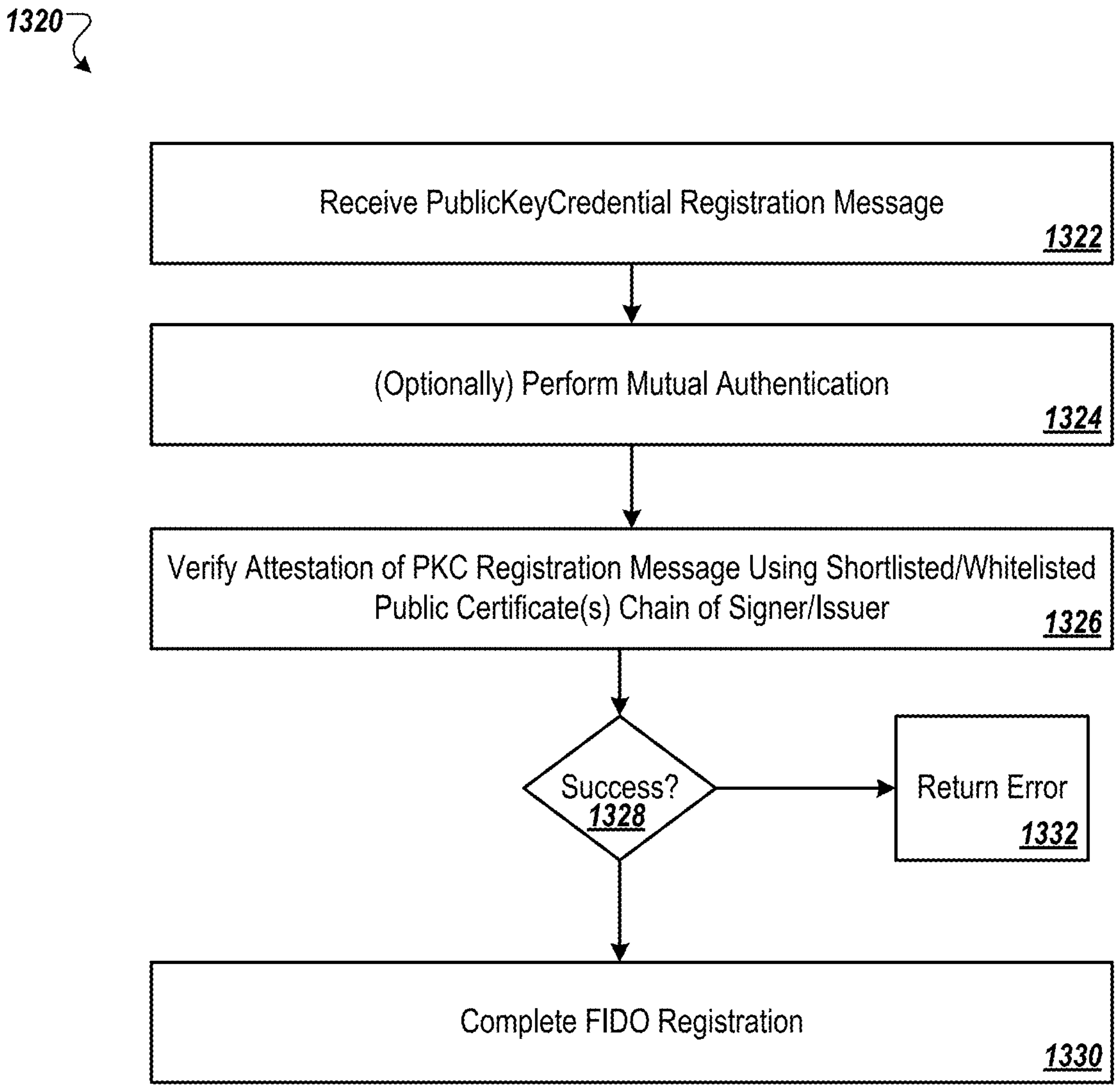
FIG. 13B is a flow diagram illustrating an embodiment of a process to verify the hardware source of a FIDO registration, all according to at least one embodiment described in the present disclosure.

FIG. 13B is a flow diagram illustrating an embodiment of a process to verify the hardware source of a FIDO registration. In various embodiments, the process 1320 of FIG. 13B is performed by a relying party server, such as relying party server 1108. In the example shown, at 1322, a PublicKeyCredential Registration Message is received, e.g., the message sent by the FIDO Client at 1306 of FIG. 13A. At 1324, mutual authentication is performed, if configured. At 1326, the attestation of the PublicKeyCredential Registration Message is verified using the shortlisted/whitelisted public certificate(s) chain of the signer/issuer of the UEM-provisioned Certificate. For example, the UEM-provisioned certificate included in the PublicKeyCredential Registration Message may be checked against the shortlisted/whitelisted public certificate(s) chain of the signer/issuer of the UEM-provisioned Certificate and if the Certificate is determined to be currently valid the attestation is determined at 1328 to have been successfully verified. If it is determined at 1328 that the verification is successful, then at 1330 FIDO registration proceeds. If verification of the attestation fails (1328), then at 1332 an error is returned and/or other exception handling is performed.

In various embodiments, a UEM-provisioned Certificate as provided herein may be replace periodically and/or in response to security events. For example, a UEM-provisioned Certificate may expire after a prescribed period of time, or the UEM server may delete and replace a previously provisioned Certificate. In another example, a UEM server may detect or be informed of a security event affecting or potentially affecting the device and may invalidate a previously provisioned Certificate in response. In some embodiments, the UEM server updates the public certificate(s) chain of the signer/issuer of UEM-provisioned Certificates as shortlisted/whitelisted at the relying party server, e.g., periodically or upon invalidating or replacing UEM-provisioned Certificates on managed devices.

In various embodiments, techniques disclosed herein enable a relying party to verify that a FIDO registration from a soft FIDO Authenticator and/or associated FIDO Client are coming from a specific managed hardware device that is in a secure posture (state), even if the API endpoints at the relying party server are not protected by mutual authentication.

Further, modifications, additions, or omissions may be made to the method 400 without departing from the scope of the present disclosure. For example, the operations of method 400 may be implemented in differing orders. Furthermore, the outlined operations and actions are only provided as examples, and some of the operations and actions may be optional, combined into fewer operations and actions, or expanded into additional operations and actions without detracting from the disclosed embodiments.

Accordingly, in view of the disclosure related to FIGS. 11-13B, an embodiment of the present disclosure may include a method to verify a source of a FIDO registration. The method may include receiving an indication to perform a FIDO create credential operation and attesting an attestation statement of a FIDO registration message using a certificate provisioned by a management entity configured to manage the device. The method may include sending the FIDO registration message to a relying party server that is configured to verify the attestation at least in part by using data comprising or otherwise associated with a public certificate chain of the signer/issuer of the certificate provisioned by the management entity. In some embodiments, the FIDO registration message includes a PublicKeyCredential registration message. Additionally, in some embodiments, a soft FIDO Authenticator running on the processor uses the certificate provisioned by the management entity to attest the attestation statement. In these and other embodiments, a FIDO Client running on the processor may format the certificate provisioned by the management entity into the FIDO registration message and the relying party server may be configured to shortlist/whitelist the public certificates chain of the signer/issuer of the certificate provisioned by the management entity. Additionally still, in some embodiments, the relying party server may be configured to receive the public certificates chain of the signer/issuer of the certificate provisioned by the management entity from a server associated with the management entity. The management entity might include a unified endpoint management (UEM) server and the relying party server may not be protected by mutual authentication. In other embodiments, the relying party server is protected by mutual authentication and the processor is further configured to use the certificate provisioned by the management entity to complete mutual authentication with the relying party server. In some embodiments, the management entity is configured to invalidate the certificate provisioned by the management entity based at least in part on a security event associated with the device. The relying party may be configured to allow FIDO registration to proceed based at least in part on successful verification of the attestation statement of the FIDO registration message. The relying party may be configured to prevent FIDO registration from proceeding based at least in part on a determination that verification of the attestation statement of the FIDO registration message failed. Another embodiment includes a non-transitory computer-readable medium having encoded therein programming code executable by one or more processors to perform or control performance of operations of the method to verify a source of a FIDO registration or portions thereof. Yet another embodiment includes a device that includes a communication interface and a processor coupled to the communication interface. The processor is configured to perform the method to verify a source of a FIDO registration or portions thereof.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the embodiments and the concepts contributed to furthering the art and are to be construed as being without limitation to such specifically recited examples and conditions. Although embodiments have been described in detail, various changes, substitutions, and alterations could be made hereto without departing from the scope of the embodiments.

What is claimed is:

1. A method of securely storing a device password, the method comprising:

receiving from a relying party, via a communication interface, a first public encryption key associated with a first device associated with a user identity;

generating, at a second device associated with the same user identity and registering with the relying party, a public encryption key pair that includes a second public encryption key;

performing a first level of encryption with respect to a password encryption key associated with encrypting a device password of the second device to produce a singly encrypted password encryption key using the second public encryption key;

performing a second level of encryption with respect to the singly encrypted password encryption key to produce a doubly encrypted password encryption key using the first public encryption key;

storing the doubly encrypted password encryption key on the second device; and retrieving the device password of the second device using the doubly encrypted password encryption key, wherein the retrieving the password includes sending the doubly encrypted password encryption key to the first device; and the doubly encrypted password encryption key is sent to the first device via the relying party or a secure wireless communication.

2. The method of claim 1, wherein the second device includes the communication interface.

3. The method of claim 1, wherein a network communication interface includes the communications interface.

4. The method of claim 1, further comprising:

performing a first level of decryption of the doubly encrypted password encryption key to retrieve the singly encrypted password encryption key using a first private encryption key associated with the first device;

returning the singly encrypted password encryption key to the second device;

receiving the singly encrypted password encryption key;

performing a second level of decryption of the singly encrypted password encryption key to retrieve the password encryption key using a second private encryption key associated with the second public encryption key;

decrypting the device password using the password encryption key; and providing access to the second device using the device password.

5. The method of claim 1, further comprising sending the second public encryption key to the relying party as a custom attribute in client data of a WebAuthn Make Credential Response.

6. The method of claim 1, further comprising sending the first public encryption key to the relying party as a custom attribute in client data of a WebAuthn Make Credential Response.

7. The method of claim 1, wherein the first device includes a mobile device managed by an enterprise mobility management (EMM) solution.

8. The method of claim 7, wherein the second device comprises a desktop device managed by a unified endpoint management (UEM) or another security solution not associated directly with the EMM solution.

9. A non-transitory computer-readable medium having encoded therein programming code executable by one or more processors to perform or control performance of operations of securely storing a device password, the operations comprising:

receiving from a relying party, via a communication interface, a first public encryption key associated with a first device associated with a user identity;

generating, at a second device associated with the same user identity and registering with the relying party, a public encryption key pair that includes a second public encryption key;

performing a first level of encryption with respect to a password encryption key associated with encrypting a device password of the second device to produce a singly encrypted password encryption key using the second public encryption key;

performing a second level of encryption with respect to the singly encrypted password encryption key to produce a doubly encrypted password encryption key using the first public encryption key;

storing the doubly encrypted password encryption key on the second device;

retrieving the device password of the second device using the doubly encrypted password encryption key, wherein the retrieving the password includes sending the doubly encrypted password encryption key to the first device; and the doubly encrypted password encryption key is sent to the first device via the relying party or a secure wireless communication;

performing a first level of decryption of the doubly encrypted password encryption key to retrieve the singly encrypted password encryption key using a first private encryption key associated with the first device;

returning the singly encrypted password encryption key to the second device;

receiving the singly encrypted password encryption key;

performing a second level of decryption of the singly encrypted password encryption key to retrieve the password encryption key using a second private encryption key associated with the second public encryption key;

decrypting the device password using the password encryption key; and providing access to the second device using the device password.

10. The method of claim 9, wherein the second device includes the communication interface.

11. The method of claim 9, wherein a network communication interface includes the communications interface.

12. The method of claim 9, further comprising sending the second public encryption key to the relying party as a custom attribute in client data of a WebAuthn Make Credential Response.

13. The method of claim 9, further comprising sending the first public encryption key to the relying party as a custom attribute in client data of a WebAuthn Make Credential Response.

14. The method of claim 9, wherein the first device includes a mobile device managed by an enterprise mobility management (EMM) solution.

15. The method of claim 14, wherein the second device comprises a desktop device managed by a unified endpoint management (UEM) or another security solution not associated directly with the EMM solution.

16. A system configured to securely store a device password, the system comprising:

a communication interface; and a processor coupled to the communication interface and configured to:

receive from a relying party, via the communication interface, a first public encryption key associated with a first computing device associated with a user identity;

generate at a second computing device associated with the same user identity and register with the relying party a public encryption key pair that includes a second public encryption key;

using the second public encryption key to perform a first level of encryption with respect to a password encryption key associated with encrypting a device password of the second computing device to produce a singly encrypted password encryption key;

using the first public encryption key to perform a second level of encryption with respect to the singly encrypted password encryption key to produce a doubly encrypted password encryption key;

store the doubly encrypted password encryption key on the second computing device;

use the doubly encrypted password encryption key to retrieve the device password of the second computing device by sending the doubly encrypted password encryption key to the first computing device via the relying party or via a secure wireless communication;

the first computing device is configured to:

use a first private encryption key associated with the first computing device to perform a first level of decryption of the doubly encrypted password encryption key to retrieve the singly encrypted password encryption key; and return the singly encrypted password encryption key to the second computing device; and the processor is further configured to:

receive the singly encrypted password encryption key;

use a second private encryption key associated with the second public encryption key to perform a second level of decryption of the singly encrypted password encryption key to retrieve the password encryption key;

use the password encryption key to decrypt the device password; and use the device password to provide access to the second computing device.

17. The system of claim 16, wherein the communication interface and the processor comprise the second computing device or the communications interface comprises a network communication interface.

18. The system of claim 16, wherein:

the processor is configured to send the second public encryption key to the relying party as a custom attribute in client data of a WebAuthn Make Credential Response; and the first computing device is configured to send the first public encryption key to the relying party as a custom attribute in client data of a WebAuthn Make Credential Response.

19. The system of claim 16, wherein:

the first computing device comprises a mobile device that is managed by an enterprise mobility management (EMM) solution; and the second computing device comprises a desktop device managed by a unified endpoint management (UEM) or other security solution not associated directly with the EMM solution.

* * * * *